(12) United States Patent
Ternullo et al.

(10) Patent No.: US 7,386,238 B2
(45) Date of Patent: *Jun. 10, 2008

(54) METHOD AND SYSTEM FOR INFRARED DATA COMMUNICATIONS

(75) Inventors: Noah J. Ternullo, Pittsburgh, PA (US); Nader Mehravari, Ithaca, NY (US); Patrick H. Madden, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 831 days.

This patent is subject to a terminal disclaimer.

(21) Appl. No.: 10/230,564

(22) Filed: Aug. 29, 2002

(65) Prior Publication Data

US 2003/0020993 A1    Jan. 30, 2003

Related U.S. Application Data

(63) Continuation-in-part of application No. 09/930,421, filed on Aug. 15, 2001, now Pat. No. 7,215,887, and a continuation-in-part of application No. 09/930,004, filed on Aug. 15, 2001, now Pat. No. 6,954,893, and a continuation-in-part of application No. 09/929,979, filed on Aug. 15, 2001, now Pat. No. 7,280,823, and a continuation-in-part of application No. 09/929,995, filed on Aug. 15, 2001.

(60) Provisional application No. 60/225,349, filed on Aug. 15, 2000.

(51) Int. Cl.
*H04B 10/00* (2006.01)

(52) U.S. Cl. ............ 398/118; 398/115; 398/127; 398/128; 398/130; 398/135; 398/136; 398/138; 398/66; 398/67; 398/70; 398/71; 398/72; 398/96; 398/103; 455/414; 455/414.4; 455/3.01; 455/3.03; 455/11.1; 455/13.1; 705/14; 705/26; 705/27; 715/503; 714/807; 709/201; 709/218; 709/219; 709/247

(58) Field of Classification Search ........ 398/182–191, 398/118, 115, 127, 128, 135, 130, 136, 137, 398/138, 66, 67, 70, 71, 72, 96, 103; 709/227–250, 709/201, 218, 219, 247; 710/102, 301; 707/10; 455/414, 414.4, 3.01, 3.03, 13.1, 11.1; 705/14, 705/26, 27; 714/807; 715/503

See application file for complete search history.

(56) References Cited

U.S. PATENT DOCUMENTS

| | | | |
|---|---|---|---|
| 4,975,926 A | 12/1990 | Knapp | 375/1 |
| 4,992,940 A | 2/1991 | Dworkin | 705/26 |
| 5,047,614 A | 9/1991 | Bianco | 235/385 |
| 5,067,104 A | 11/1991 | Krishnakumar et al. | 712/226 |
| 5,250,789 A | 10/1993 | Johnsen | 705/14 |
| 5,260,936 A | 11/1993 | Bardet et al. | 370/61 |
| 5,260,938 A | 11/1993 | Hofmann | 370/269 |
| 5,295,064 A | 3/1994 | Malec et al. | 705/1 |
| 5,307,349 A | 4/1994 | Shloss et al. | 370/85.2 |
| 5,321,542 A | 6/1994 | Freitas et al. | 398/127 |
| 5,410,326 A | 4/1995 | Goldstein | 348/134 |
| 5,420,572 A | 5/1995 | Dolin, Jr. et al. | 340/825.22 |
| 5,424,524 A | 6/1995 | Ruppert et al. | 705/8 |
| 5,469,206 A | 11/1995 | Strubbe et al. | 725/60 |
| 5,546,211 A | 8/1996 | Devon | 359/154 |
| 5,611,051 A | 3/1997 | Pirelli | 705/10 |
| 5,646,608 A | 7/1997 | Shintani | 340/825.52 |
| 5,663,952 A | 9/1997 | Gentry, Jr. | 370/252 |
| 5,664,110 A | 9/1997 | Green | 705/26 |
| 5,758,087 A | 5/1998 | Aaker et al. | 395/200.62 |
| 5,790,295 A | 8/1998 | Devon | 359/189 |
| 5,790,605 A | 8/1998 | Helm et al. | 375/347 |
| 5,815,516 A | 9/1998 | Aaker et al. | 371/53 |
| 5,825,002 A | 10/1998 | Roslak | 235/375 |
| 5,831,664 A | 11/1998 | Wharton et al. | 348/13 |
| 5,832,296 A | 11/1998 | Wang et al. | 395/823 |
| 5,844,544 A | 12/1998 | Kahn et al. | 345/156 |
| 5,845,263 A | 12/1998 | Camaisa et al. | |
| 5,845,282 A | 12/1998 | Alley et al. | 707/10 |
| 5,850,433 A | 12/1998 | Rondeau | 379/218.01 |

| | | | |
|---|---|---|---|
| 5,852,664 A | 12/1998 | Iverson et al. ............... 380/25 |
| 5,857,201 A | 1/1999 | Wright, Jr. et al. ......... 707/104 |
| 5,867,292 A * | 2/1999 | Crimmins et al. .......... 398/103 |
| 5,873,045 A | 2/1999 | Lee et al. ................ 455/556.2 |
| 5,878,218 A | 3/1999 | Maddalozzo, Jr. et al. ...... 395/200.43 |
| 5,884,215 A | 3/1999 | Birchler et al. ............. 701/207 |
| 5,897,622 A | 4/1999 | Blinn et al. .................... 705/26 |
| 5,898,713 A | 4/1999 | Melzer et al. ................ 371/53 |
| 5,898,836 A | 4/1999 | Freivald et al. ........ 395/200.48 |
| 5,912,752 A | 6/1999 | Mollett et al. ............... 359/137 |
| 5,923,735 A | 7/1999 | Swartz et al. ............ 379/93.12 |
| 5,946,697 A | 8/1999 | Shen .......................... 707/104 |
| 5,950,173 A | 9/1999 | Perkowski ................... 705/26 |
| 5,956,693 A | 9/1999 | Geerlings ..................... 705/14 |
| 5,966,225 A | 10/1999 | Taglione et al. ............ 359/152 |
| 5,969,678 A | 10/1999 | Stewart ...................... 342/457 |
| 5,971,277 A | 10/1999 | Cragun et al. ......... 235/462.01 |
| 5,974,238 A | 10/1999 | Chase, Jr. .............. 395/200.78 |
| 5,979,757 A | 11/1999 | Tracy et al. .................. 235/38 |
| 5,982,520 A | 11/1999 | Weiser et al. ............... 359/172 |
| 5,986,787 A | 11/1999 | Ohshima et al. ............ 359/159 |
| 6,009,441 A | 12/1999 | Mathieu et al. ............. 707/516 |
| 6,012,049 A | 1/2000 | Kawan ........................ 705/41 |
| 6,026,088 A | 2/2000 | Rostoker et al. ............ 370/395 |
| 6,038,551 A | 3/2000 | Barlow et al. ................ 705/41 |
| 6,044,403 A | 3/2000 | Gerszberg et al. .......... 709/225 |
| 6,061,057 A | 5/2000 | Knowlton et al. .......... 345/335 |
| 6,064,502 A | 5/2000 | Burns et al. ................ 359/152 |
| 6,064,979 A | 5/2000 | Perkowski ................... 705/26 |
| 6,065,681 A | 5/2000 | Trueggelmann ............. 235/487 |
| 6,073,112 A | 6/2000 | Geerlings ..................... 705/14 |
| 6,073,842 A | 6/2000 | Yoshinaga ............... 235/382.5 |
| 6,078,806 A | 6/2000 | Heinonen et al. ........... 455/406 |
| 6,085,030 A | 7/2000 | Whitehead et al. .... 395/200.33 |
| 6,092,053 A | 7/2000 | Boesch et al. ................ 705/26 |
| 6,092,120 A | 7/2000 | Swaminathan et al. ...... 709/247 |
| 6,094,724 A | 7/2000 | Benhammou et al. ....... 713/202 |
| 6,098,188 A | 8/2000 | Kalmanek, Jr. et al. .... 714/746 |
| 6,101,483 A | 8/2000 | Petrovich et al. ............. 705/26 |
| 6,101,486 A | 8/2000 | Roberts et al. ............... 705/27 |
| 6,108,703 A | 8/2000 | Leighton et al. ............ 709/226 |
| 6,119,935 A | 9/2000 | Jelen et al. .................. 235/383 |
| 6,123,259 A | 9/2000 | Ogasawara ................. 235/380 |
| 6,125,352 A | 9/2000 | Franklin et al. .............. 705/26 |
| 6,129,276 A | 10/2000 | Jelen et al. .................. 235/383 |
| 6,185,541 B1 | 2/2001 | Scroggie et al. .............. 705/14 |
| 6,189,781 B1 | 2/2001 | Yoshinaga et al. .......... 235/375 |
| 6,199,753 B1 | 3/2001 | Tracy et al. ................. 235/375 |
| 6,249,767 B1 | 6/2001 | Okayama et al. |
| 6,272,575 B1 * | 8/2001 | Rajchel ....................... 710/301 |
| 6,278,499 B1 | 8/2001 | Darbee et al. ............... 348/734 |
| 6,292,283 B1 | 9/2001 | Grandbois .................. 359/143 |
| 6,311,167 B1 | 10/2001 | Davis et al. .................. 705/35 |
| 6,381,465 B1 | 4/2002 | Chern et al. ................ 455/466 |
| 6,385,591 B1 | 5/2002 | Mankoff ....................... 705/14 |
| 6,397,057 B1 | 5/2002 | Malackowski et al. .. 455/414.1 |
| 6,405,318 B1 | 6/2002 | Rowland .................... 713/200 |
| 6,446,111 B1 | 9/2002 | Lowery ....................... 709/203 |
| 6,505,046 B1 | 1/2003 | Baker ....................... 455/456.3 |
| 6,568,596 B1 | 5/2003 | Shaw ..................... 235/462.01 |
| 6,587,835 B1 | 7/2003 | Treyz et al. ................... 705/14 |
| 6,601,038 B1 | 7/2003 | Kolls ............................ 705/14 |
| 6,629,151 B1 * | 9/2003 | Bahl ........................... 709/250 |
| 6,643,510 B2 | 11/2003 | Taylor ....................... 455/431 |
| 6,643,650 B1 * | 11/2003 | Slaughter et al. ............. 707/10 |
| 6,647,269 B2 * | 11/2003 | Hendrey et al. ......... 455/456.3 |
| 6,650,451 B1 * | 11/2003 | Byers et al. ................. 398/129 |
| 6,654,816 B1 | 11/2003 | Zaudtke et al. ................ 710/1 |
| 6,684,399 B1 | 1/2004 | Grooters ...................... 725/48 |
| 6,721,787 B1 * | 4/2004 | Hiscock ...................... 709/217 |
| 6,738,951 B1 | 5/2004 | Weiss et al. ................. 715/523 |
| 6,760,916 B2 | 7/2004 | Holtz et al. .................. 725/34 |
| 6,766,163 B1 * | 7/2004 | Sharma .................... 455/412.1 |
| 6,785,902 B1 | 8/2004 | Zigmund et al. ............. 725/38 |
| 6,857,013 B2 | 2/2005 | Ramberg et al. ............ 709/223 |
| 6,857,021 B1 * | 2/2005 | Schuster et al. ............ 709/227 |
| 6,966,027 B1 | 11/2005 | Krasinski ..................... 715/513 |
| 6,975,835 B1 | 12/2005 | Lake et al. ................ 455/3.01 |
| 7,072,939 B1 | 7/2006 | Amro et al. |
| 7,200,848 B1 * | 4/2007 | Slaughter et al. ............ 719/317 |
| 2001/0049636 A1 | 12/2001 | Hudda et al. ................. 705/26 |
| 2001/0054114 A1 | 12/2001 | DuVal et al. ................ 709/247 |
| 2002/0006788 A1 | 1/2002 | Knutsson et al. ......... 455/422.1 |
| 2002/0019782 A1 | 2/2002 | Hershtik ...................... 705/26 |
| 2002/0039882 A1 * | 4/2002 | Ternullo et al. ............ 455/11.1 |
| 2002/0040388 A1 * | 4/2002 | Ternullo et al. ............ 709/218 |
| 2002/0052781 A1 | 5/2002 | Aufricht et al. .............. 705/14 |
| 2002/0055924 A1 | 5/2002 | Liming ....................... 707/100 |
| 2002/0083179 A1 | 6/2002 | Shaw et al. ................. 709/227 |
| 2002/0104087 A1 | 8/2002 | Schaffer et al. ............... 725/46 |
| 2002/0191258 A1 * | 12/2002 | Ternullo et al. ............ 359/172 |
| 2003/0053177 A1 | 3/2003 | Kawamura .................. 359/174 |
| 2003/0130909 A1 | 7/2003 | Caci et al. ..................... 705/27 |
| 2004/0077351 A1 | 4/2004 | Inoue et al. ................. 455/444 |
| 2005/0097008 A1 | 5/2005 | Ehring et al. ................. 705/26 |

FOREIGN PATENT DOCUMENTS

| | | |
|---|---|---|
| DE | 19718904 A | 12/1998 |
| EP | 0552861 | 7/1993 |
| EP | 0552861 A2 | 7/1993 |
| EP | 0837406 A2 | 4/1998 |
| WO | WO 98/18094 | 4/1998 |
| WO | WO 01/20526 A1 | 3/2001 |
| WO | PCT/US01/25593 | 8/2001 |
| WO | WO 02/15438 A1 | 2/2002 |

OTHER PUBLICATIONS

Postel, J. (Ed.) (Sep. 1981) "Transmission Control Protocol: Darpa Internet Program Protocol Specification." Prepared for Defense Advanced Research Projects Agency, Information Processing Techniques Office by Information Sciences Institute, University of Southern California, pp. i-85.
Braden, R. et al. (Sep. 1988) "Computing the Internet Checksum." Braden, Borman & Partridge memo, pp. 1-24.
Noah J. Ternullo et al., U.S. Appl. No. 09/930,421, filed Aug. 15, 2001, Entitled Method and Apparatus for Infrared Data Communication.
Noah J. Ternullo et al., U.S. Appl. No. 09/930,004, filed Aug. 15, 2001, Entitled Method and Apparatus for Reliable Unidirectional Communication in a Data Network.
Noah J. Ternullo et al., U.S. Appl. No. 09/929,979, filed Aug. 15, 2001, Entitled Method and Apparatus for for Determining the Context of a Handheld Device.
Noah J. Ternullo et al., U.S. Appl. No. 09/929,995, filed Aug. 15, 2001, Entitled Method and Apparatus for Delivering Services in a Constrained Environment.
Noah J. Ternullo et al., U.S. Appl. No. 60/225,349, filed Aug. 15, 2000, Entitled InfoFlo: A Commonication Infrastructure for Pushing Context to a Mobile PDA.
John Cox, "WideRay Beams Data to Handhelds", Network World, May 27, 2002; pp. 15 and 18.
Bohm, "On extending the XML engine with query-processing capabilities", IEEE Proceedings, May 22-24, 2000, Abstract.
Bluestone Pushes XML as PDA Data Synchronization Method, Dan Jones, Computergram International, Apr. 28, 1999.
Dan Jones, Bluestone Pushes XML as PDA Data Synchronization Method by Computergram International, Apr. 28, 1999.

* cited by examiner

*Primary Examiner*—Hanh Phan
(74) *Attorney, Agent, or Firm*—Burns & Levinson LLP; Jacob N. Erlich; Kathleen Chapman

(57) ABSTRACT

A method and system for conveying contextually relevant information to a wireless client are disclosed. More particularly, a transmitter transmits a diffuse infrared signal to a client having an IrDA compliant communication interface. The transmitter communicates with the client by making a link layer in the transmitter compliant with an IrDA link layer running on the client. To perform communication, data is received at the transmitter from a service provider. The data is formatted into an IrDA compliant diffuse infrared signal and transmitted to the client. The client receives the data and parses it to extract contextually relevant information contained therein. The client may reply to the transmitter if a user of the client is interested in a service offered by the service provider. If the service provider receives a reply from the client, the service is made available to client.

44 Claims, 9 Drawing Sheets

METHOD AND SYSTEM FOR INFRARED DATA COMMUNICATIONS

CROSS REFERENCE TO RELATED APPLICATIONS

The instant application is a continuation-in-part of the following U.S. patent applications having:
(1) Ser. No. 09/930,421 now U.S. Pat. No. 7,215,887, entitled "METHOD AND APPARATUS FOR INFRARED DATA COMMUNICATION,"
(2) Ser. No. 09/930,004 now U.S. Pat. 6,954,893, entitled "METHOD AND APPARATUS FOR RELIABLE UNIDIRECTIONAL COMMUNICATION IN A DATA NETWORK,"
(3) Ser. No. 09/929,979 now U.S. Pat. No. 7,280,823, entitled "METHOD AND APPARATUS FOR DETERMINING THE CONTEXT OF A HANDHELD DEVICE,"
(4) Ser. No. 09/929,995, entitled "METHOD AND APPARATUS FOR DELIVERING SERVICES IN A CONSTRAINED ENVIRONMENT,"

all having assignee in common with the instant application, all having a filing date of Aug. 15, 2001, all hereby incorporated by reference in their entirety, and all claiming priority from provisional application Ser. No. 60/225,349 filed Aug. 15, 2000 and entitled "InfoFlo: A Common Infrastructure for Pushing Context to a Mobile PDA,".

BACKGROUND OF THE INVENTION

The present invention relates generally to the field of wireless data communications and more particularly to XML based infrared data communications for facilitating context sensitive computing in handheld devices.

Proliferation of the Internet has made it possible for users to access vast amounts of data almost effortlessly. For example, with only a few mouse clicks users may inundate themselves with data such as; commercial data, scientific data, educational data, financial data, and data on general areas of interest such as sports and hobbies. Ease of access to networked data has helped fuel demand for even more types of data. Accompanying users' demand for data is a desire to have it sorted based on user preferences before the data is viewed or utilized. Failure to deliver data to users in a sorted manner wastes the users' time, leads to network congestion because of repeated requests for new data, and wastes processing and storage resources if large amounts of data must be processed to present a user with relevant information.

Problems associated with unfiltered data are especially challenging when users wish to take advantage of information while remaining mobile. These users are increasingly relying on wireless devices such as personal digital assistants (PDAs), handheld computers and web enabled cell phones for processing information when on the go. An example would be a wireless device used to store personal contact information, calendars, email, business information, and financial information. While wireless devices have some processing capabilities, they are very limited when compared to desktop computing devices. Since wireless devices normally run on batteries, efforts must be made to reduce power consumption. Typically, slow speed processors and reduced memory sizes are employed to reduce power consumption. In addition, reducing the use of, or eliminating power hungry add-on components such as radio frequency transceivers (e.g. cellular and wireless Ethernet), modems, global positioning system (GPS) receivers, and the like, help to extend the life of batteries in wireless devices.

Context sensitive computing may be employed to address some of the shortcomings associated with providing unfiltered data to wireless devices. More specifically, context sensitive computing attempts to send users only data that is relevant to their needs. Context as used herein is comprised of two parts. The first part is an environmental context that describes the physical location of a user (e.g. an airport, a car, or a store) and the second part is referred to as a personal context and is associated with a user's personal preferences (e.g. a particular colored shirt, a favorite author, etc). In principle, context sensitive computing makes it possible to provide users of wireless devices having limited processing capabilities with relevant information.

To aid in the understanding of how contextual computing can aid users of wireless devices by providing them with relevant information an example will be presented. In this example a consumer would like to make a purchase at a shopping mall. In addition, the consumer would like to have relevant information, such as the latest sale price and industry reviews for a desired product, and the consumer also would like to know which merchant carries a particular style or color of the item sought. In this scenario, the consumer has two primary options for using data to facilitate selection of a product and a possible purchase. For example, the consumer may first review data in their home or at a library and make notes or print copies of the materials to then take shopping with them. The disadvantage with this approach is that the consumer may be using outdated information when attempting to make the purchase at the merchant's location. Alternatively, a consumer trying to avoid using outdated information for facilitating a purchase may attempt to ask various merchants for the latest pricing and selection options of the desired product. This later approach has a disadvantage in that it does not use the consumer's time efficiently.

In the example above, the consumer would be better served if they employed wireless computing devices to ensure that the latest data is presented to them in the most efficient manner. The wireless device should be able to determine the relevant environmental context within which the consumer is operating so that only relevant information is provided to the consumer. As previously discussed, environmental context refers to the physical environment in which the consumer, or user, is operating. In this example, environmental context may be a mall or a particular store within a mall. In addition, the wireless device should be able to sort available information so that a consumer is presented only with information that is relevant to their interests.

Prior art techniques for determining environmental context rely on the wireless device for processing information to determine position; or, alternatively, they use the infrastructure (i.e. ground based transmitters) to process information received from a wireless device to establish the location. When the wireless device processes data to establish position, global positioning receivers (GPS) are normally used. Some disadvantages associated with GPS receivers are that they typically require additional power and generally do not work well indoors. When the network infrastructure attempts to determine position, radio-frequency (RF) ranging techniques are used. RF ranging techniques normally employ beacons that transmit data to, and receive data from, wireless devices. Some of the disadvantages associated with RF beaconing techniques are that their locational accuracy is not very good and the wireless device consumes excessive power when transmitting beacon signals or when processing received beacon signals.

Prior art techniques for communicating data to wireless devices also have shortcomings. RF signals are the primary means for transmitting data to, and from, wireless devices. Since RF signals such as cellular, wireless Ethernet, Bluetooth™, and microwave consume large amounts of power, they do not efficiently utilize available power in wireless devices.

SUMMARY OF THE INVENTION

Embodiments of the present invention employ apparatus and methods for efficiently performing infrared data communication with a handheld device. More specifically, an aspect of the invention provides a system for making service available over a network to a user operating a handheld device comprises a means for advertising the service over the network by conveying an advertisement to a transmitter having a photo emissive device associated with it. The photo emissive device conveys the advertisement as a transmitted signal to the handheld device that is located within a coverage area associated with the transmitter. The system further includes a means for providing the service over the network.

In another aspect of the invention, a further method for providing a service over a network is provided. An advertisement about the service is generated at a service provider and conveyed to a transmitter operatively coupled to the network. The transmitter in turn conveys the advertisement to a handheld device having a user associated with it.

In still a further aspect of the invention, a network for conveying an advertisement about a service offered by a service provider comprises a means for determining a destination for the advertisement. The destination has a photo emissive device associated with it that is capable of generating an infrared-data-association compliant diffuse infrared signal having a coverage area associated therewith. The network also includes a means for conveying the advertisement to the destination over the network.

It is advantageous to employ various embodiments of the present invention for delivering services to a handheld device in a constrained networking environment. For example, an embodiment of the present invention operating within a given context may make a decision regarding a service based on an advertisement. Still a further embodiment of the present invention may only display information contained in an advertisement to a user of a handheld device if the user has expressed a preference for a service associated with the advertisement.

Further advantages of the present invention will become more apparent after reference to the detailed description of exemplary embodiments thereof taken in conjunction with the accompanying drawings in which:

DETAILED DESCRIPTION OF PREFERRED EMBODIMENTS

The disclosed invention solves the problems of the prior art by providing a uniquely designed system for delivering contextually relevant information to a handheld device. As used herein, contextually relevant information is comprised of two parts. The first part is environmental, or locational context. Locational context refers to a physical location such as an isle in a department store, a seat in a sporting complex, or a conference room in an office building, or the like. The second part is referred to as a personal context as it relates to a user's interests. Examples of a personal context for a particular user are books by a particular author, a particular size or style of clothing, and departure times for flights to a particular destination. Personal context can be a function of a user's interests independent of locational context, such as a user's hobby, or, they can be a function of locational context such as a user's preferred food entre available at a restaurant in a given shopping mall. Therefore, a user's conduct may become part of the personal context associated therewith. Embodiments of the invention may make use of both locational and personal context, either independently or in combination, when making information available to a user of a handheld device. As previously noted, prior art techniques force the handheld device to determine context using onboard sensors or by performing complex processing tasks. In the present invention, locational context is pushed to the handheld device using a network infrastructure and network protocol. The network infrastructure and protocol are used in a manner that allows a service to deliver relevant content to wireless users while greatly reducing the processing and power demands placed on a handheld device.

To aid in understanding the invention, examples are periodically used herein. These examples are intended to be illustrative and non-limiting; therefore, examples should not be construed in a manner limiting the scope of embodiments or alternative embodiments in any way.

Figure 1A:
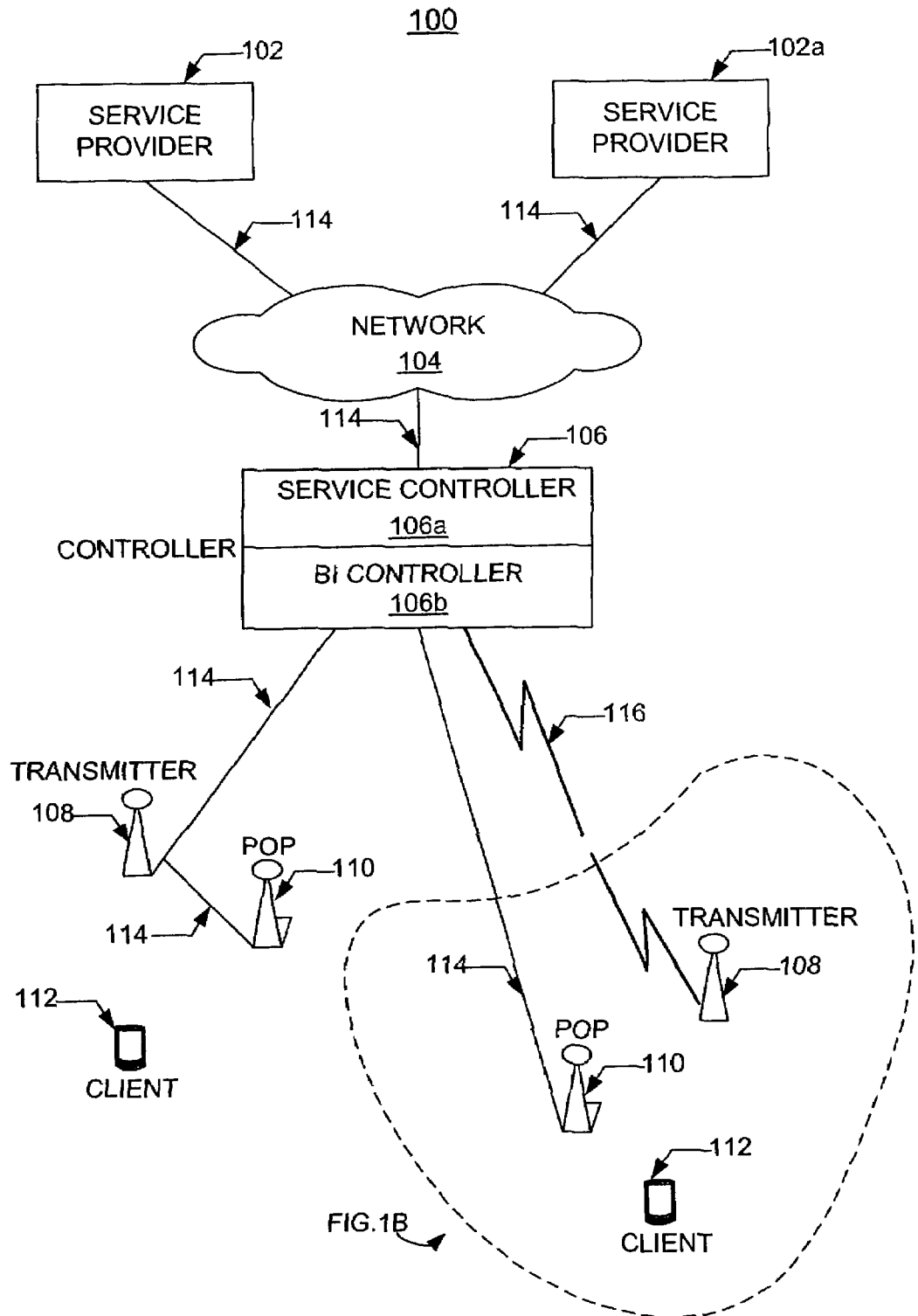
FIGS. 1A and B are schematic diagram of a system for transmitting context to a handheld device and a schematic diagram of components operating within the system, respectively.

FIG. 1A illustrates an overall architecture that may be used for practicing preferred embodiments of the invention. In particular, FIG. 1A shows system 100 comprising service providers 102, 102a (hereinafter primarily referred to as service provider 102), network 104, controller 106 comprising broadcast information (BI) controller 106a and service controller 106b, one or more transmitters 108, one or more points-of-presence (POPs) 110, and one or more client devices 112. As used herein client, or client device, will be used interchangeably to identify a handheld device capable of receiving contextually relevant information, and user will identify a person operating a client 112 or making use of information contained therein.

Service provider 102 is communicatively coupled to network 104 by link 114. Service provider 102 is an entity wishing to provide a service to client device 112. Typically, service provider 102 will include a computer executing software enabling it to provide services of interest to a user of client 112. Examples of services that may be provided are, but are not limited to, credit card purchase validations, online catalogs, online banking information, travel planning information, medical information and the like. Additionally, service provider 102 may operate individually to provide services to a user, or alternatively, it may operate in concert with other service providers when servicing a user.

Links 114 are communication media allowing devices coupled to network 104 to communicate with one another. Typically, links 114 may be comprised of optical fiber; however, they may also be comprised of coaxial cable, twisted pair wire, RF links 116, or the like.

Network 104 may be comprised of a plurality of links 114 or 116 and network components (not shown) for facilitating the movement of communication signals from an originating point to a termination point. Examples of network components that may be used in conjunction with links 114 and 116 for facilitating communications are, but are not limited to, routers, switches, bridges, gateways, firewalls, and the like. For many embodiments of the invention, network 104 will be comprised of a public network such as the Internet employing transport control protocol/Internet protocol (TCP/IP). However, the invention is not limited to a single network, nor is it limited to a particular type of network or to a network operating with a single protocol. For example, the invention may be practiced with private networks such as virtual private networks (VPNs), or local area networks (LANs) coupled to a public network such as the Internet. In addition, network 104 may operate with virtually any network protocol such as asynchronous transfer mode (ATM), synchronous optical network (sonet), frame relay, or the like, or, alternatively, network 104 may operate with wireless protocols such as code division multiple access (CDMA), time division multiple access (TDMA), wireless Ethernet, or the like. Thus the invention is very flexible with respect to network implementations and protocols.

In FIG. 1A, network 104 conveys data from service provider 102 to controller 106. Although network 104 is shown coupling service provider 102 to controller 106, it may also connect controller 106 to transmitter 108 and to POP 110 in embodiments other than that illustrated in FIG. 1A.

Controller 106 may be comprised of a computer executing software for providing the functionality of a service controller 106a and a broadcast information controller 106b. It is noted that controller 106 may incorporate additional functionality and it may be implemented in a distributed fashion rather than as the single entity shown in FIG. 1A. Service controller 106a ensures that data exchanges between service provider 102 and controller 106 are properly handled. For example, service controller 106a may perform error detection and correction, data encryption, transport protocol conversion, and the like. Service provider 102 and service controller 106a may communicate using any mutually agreed upon data protocol.

Broadcast information controller 106b handles the distribution of broadcast information, referred to as a broadcast to transmitter 108 and POP 110 for distribution to client 112. As used herein, the term broadcast, or broadcast signal, denotes a one-way communication signal going from an originating location to a terminating location. Broadcasts may be directed to a single termination point, for example to a specific transmitter in a known location, or they may be transmitted to a plurality of termination points. Furthermore, broadcast signals may be conveyed over a wire line communication medium or a wireless communication medium.

In a preferred embodiment, broadcasts are comprised of a series of extensible markup language (XML) elements containing information of interest to a user of client 112 and conveyed over a wireless link 116. Use of XML elements in conjunction with embodiments of the invention will be later described herein.

Figure 1B:
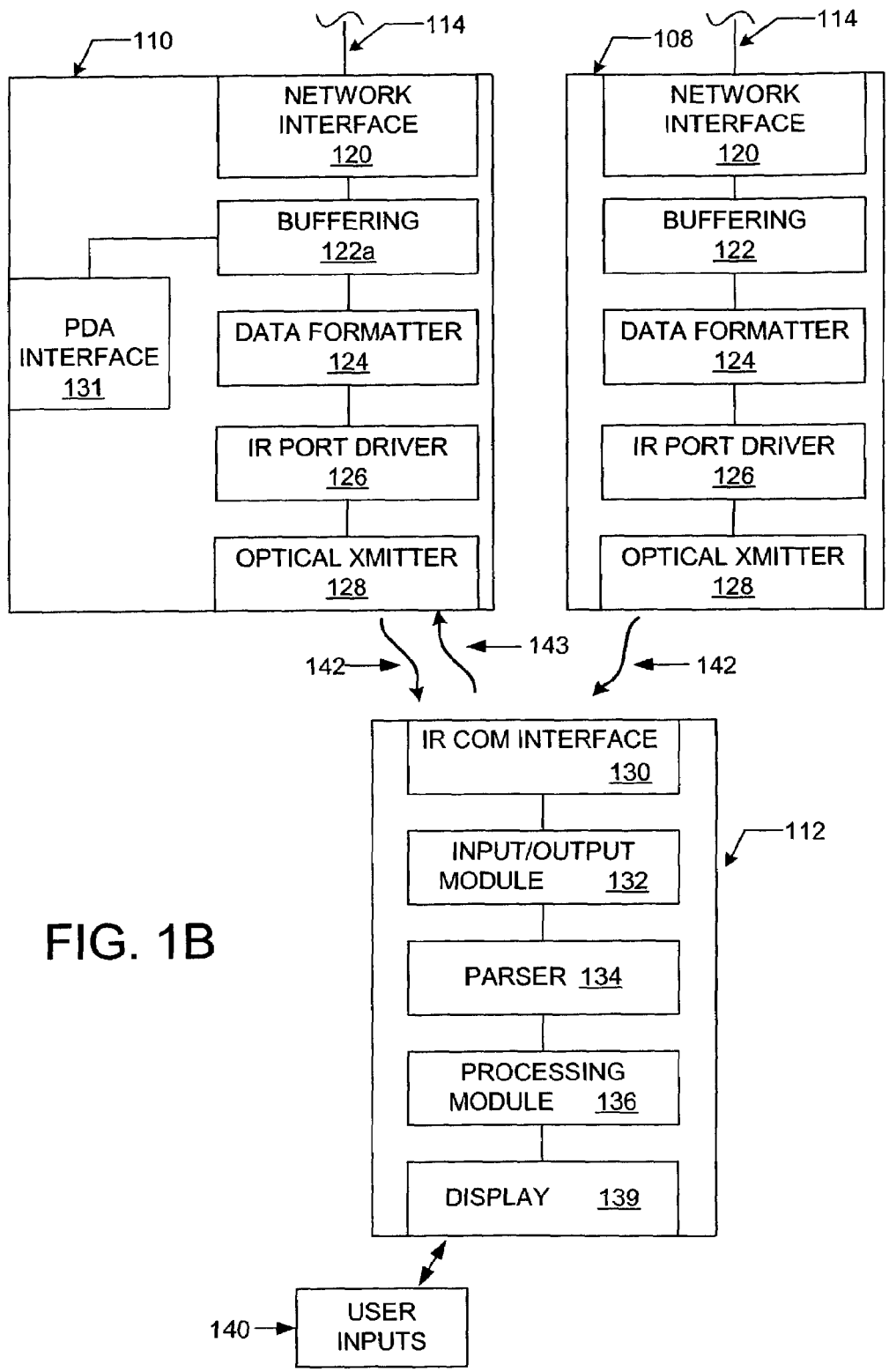

FIG. 1B provides a more detailed illustration of transmitter 108, POP 110 and client 112 shown in FIG. 1A. The primary distinction between transmitter 108 and POP 110 is that transmitter 108 performs one-way wireless transmission to client 112 whereas POP 110 performs one-way wireless transmission to client 112 and in addition, may perform two-way communications with client 112. In the foregoing discussions, transmitter 108 will be used to describe and reference the hardware, software, and methodology associated with performing one-way wireless transmission. As such, it is intended that transmitter 108 will also refer to the one-way wireless transmission capabilities of POP 110.

Transmitter 108 may receive a broadcast containing XML elements from controller 106 before converting it into a wireless communication signal for transmission to client 112. In a preferred embodiment, transmitter 108 conveys information to client 112 via optical radiation. Typically, transmitter 108 is placed at a known location and is designed to have a given coverage area. As used herein, coverage area refers to the volumetric region that a broadcast penetrates, for example a room, stadium, or store isle. More specifically, for a given transmitter 108, the coverage area defines the area over which client 112 can receive broadcast signals and hence locational context information contained therein.

For a better understanding of the present invention, an exemplary and non-limiting example will be used through out the specification. In this example, an airline will comprise service provider 102. Operation of the airline as a service provider will be discussed in conjunction with operation of selected embodiments of the invention. The example will further include locational contexts such as a wing at an airport and particular gate areas within the wing. In addition, the example will include personal context items such as flight numbers and seat numbers.

Using the airline example, transmitter 108 may be located in a particular wing of an airport, here B-wing. Furthermore, transmitter 108 may be designed to transmit a signal over a specified area, here the waiting area for B-wing. Furthermore, the airline may transmit a signal to controller 106 containing information about all departures from B-wing leaving within a certain interval of time. Controller 106 may format departure information into one or more XML elements and transmit them as one or more broadcast signals to a transmitter 108 located in the B-wing waiting area. Transmitter 108 then transmits the departure information to a client 112 located within the waiting area of B-wing. A user of client 112 may then make travel arrangements based on the displayed contextually relevant information.

Returning to FIG. 1B, in conjunction with FIG. 1A, transmitter 108 and POP 110 are comprised largely of the same hardware and software components. The primary distinction between the two is that POP 110 can receive transmissions from client 112 over PDA interface 131 which may be an electromechanical interface, such as a bus or connector, or it may receive a wireless reply signal 143 from client 112. Like transmitter 108, POP 110 may be placed at a known location, have a defined coverage area, and may transmit a wireless signal such as an optical signal.

Network interface 120 receives a broadcast signal from controller 106 via link 114 or wireless link 116. Next, buffer 122, 122a may buffer incoming data to balance variations between the data rate at network interface 120 and optical transmitter 128 to prevent overwriting data awaiting transmission from transmitter 108. In POP 110 buffer 102a also performs buffering of data received at PDA interface 131 before placing it on link 114. Data formatter 124 receives data from buffer 122, 122a and performs data conversions needed to transform the received broadcast into a signal compatible with IR communications interface 130 on client 112. For example, data formatter 124 may convert a received broadcast into a format for optical transmission to client 112. From data formatter 124, the signal goes to IR port driver 126. IR port driver 126 performs amplification and signal conditioning necessary to transmit a broadcast signal as optical radiation. Optical transmitter 128 receives formatted broadcast data from IR port driver 126. Optical transmitter 128 uses photo emissive components or devices such as infrared light emitting diodes (LEDs) to convey the broadcast signal as an optical signal 142 to client 112.

Client 112 may be comprised of a handheld wireless device. In addition, client 112 may be equipped with one or more types of wireless communication means such as an optical transceiver, cellular transceiver, or other RF transceiver such as IEEE 802.11B or Bluetooth™. Most often, client 112 will be a commercially available personal digital assistant (PDA) such as, for example, the Palm Pilot™ from Palm Computing or a handheld computer such as iPAQ Blackberry™ from Compaq Computer Corporation. As used hereinafter, PDA and client 112 will be used to refer to handheld devices used in practicing embodiments of the invention. Client 112 may be comprised of an infrared (IR) communication interface 130, a input/output module 132, a parser 134, a processing module 136 and display 139.

IR communication interface 130 may receive optical signal 142 using known methods. The received signal is converted from optical to electrical form and sent to input/output module 132. Input/output module 132 performs signal demodulation, amplification and filtering for incoming signals using known methods. In addition, input/output module 132 performs amplification and modulation for optical signals transmitted from client 112. Next, the received signal is passed to parser 134, which breaks the signal into its component parts for use by processing module 136. Parser 134 may take on different forms depending on the construction and content of the received signal. For example, parser 134 may include an XML parser if the received signal is comprised of one or more XML elements. Alternatively, parser 134 may contain decryption algorithms if the received signal was received from transmitter 108 in an encrypted form.

Processing module 136 performs processing necessary to get received data into a form useful to a user of client 112. Processing module 136 may make use of plug-in modules when processing received data. As used herein, a plug-in module is a small piece of software running within a larger program. Plug-in modules make it possible to add additional functionality to larger applications or systems without having to modify the core application or system. In addition, a plug-in module performs necessary communications and data conversions without requiring a user of a device, such as client 112, to know any special programming or data handling techniques. Methods for developing and integrating plug-in modules are well known in the art, and as such are not described in detail herein.

From processing module 136, the received data may be displayed to a user of client 112 by display 139. User inputs 140 may be entered into client 112 through display 139 using a stylus, touch sensitive display, or other similar means.

Returning again to the airline example, information displayed to a user in B-wing at the airport may indicate the gate numbers and corresponding departure times for flights leaving B-wing. User inputs 140 may be accepted by display 139 and locally processed on client 112 or they may be formatted and transmitted to POP 110 via PDA interface 131.

Figure 2:
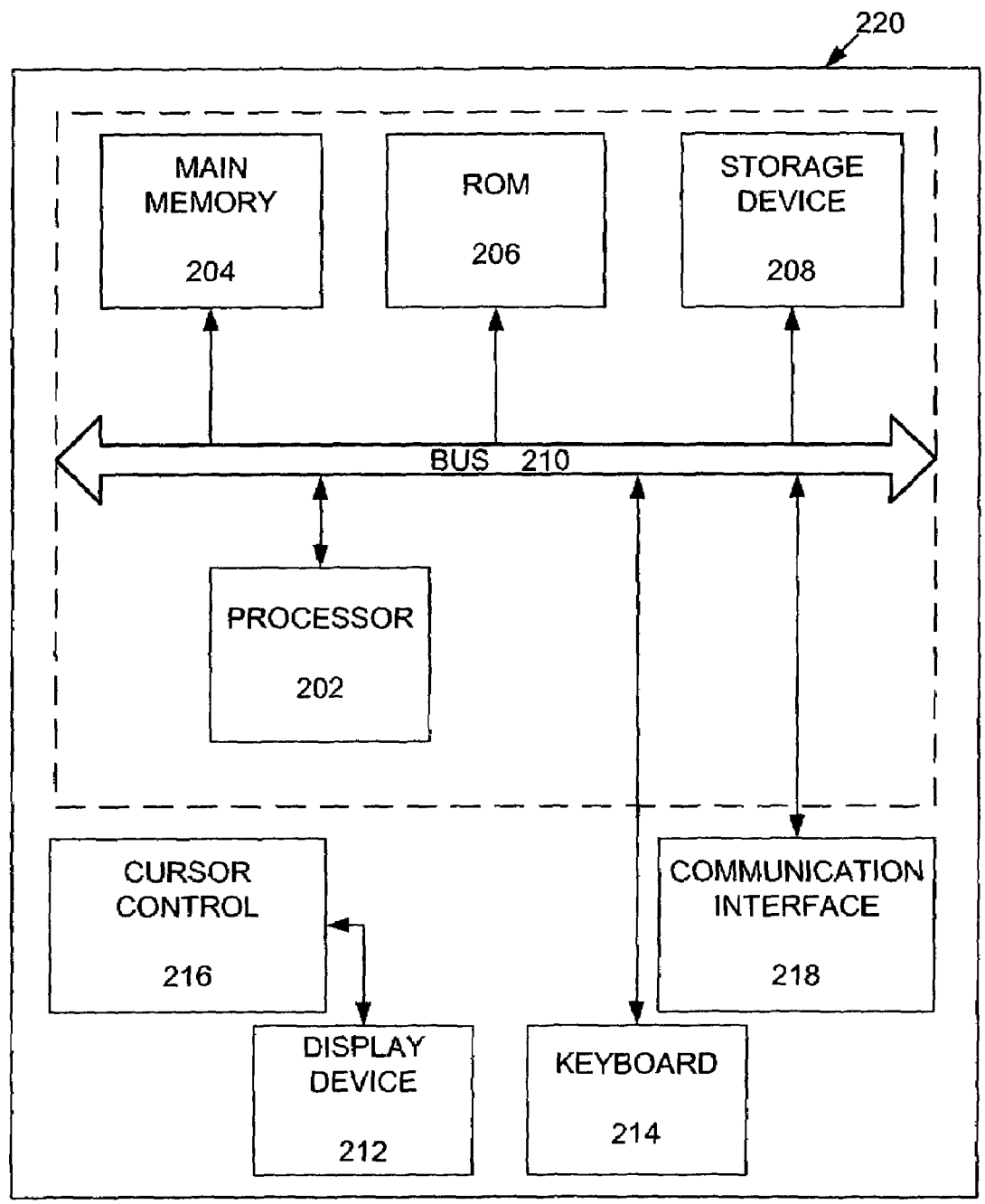
FIG. 2 is a schematic diagram of a general purpose computer that may be configured to practice embodiments of the invention.

FIG. 2 illustrates an exemplary computer 220 on, or with which, embodiments of the invention may be practiced, namely service provider 102, controller 106, transmitter 108, POP 110 and client 112. In addition, the computer of FIG. 2 may be used to practice network components identified in conjunction with FIG. 1A and used for conveying data across network 104. In FIG. 2, exemplary computer 220 includes a processor 202, main memory 204, read only memory (ROM) 206, storage device 208, bus 210, display device 212, keyboard 214, cursor control 216, and communication interface 218.

Processor 202 may be any type of conventional processing device that interprets and executes instructions. Main memory 204 may be a random access memory (RAM) or a similar dynamic storage device. Main memory 204 stores information and instructions for execution by processor 202. Main memory 204 may also be used for storing temporary variables or other intermediate information during execution of instructions by processor 202. ROM 206 stores static information and instructions for processor 202. It will be appreciated that ROM 206 may be replaced with other types of static storage devices known in the art. Data storage device 208 may include any type of magnetic or optical media and corresponding interfaces, operational hardware, and carrier-waves. Data storage device 208 stores information and instructions for use by processor 202. Bus 210 includes a set of hardware lines (conductors, optical fibers, or the like) that allow for data transfer among components of computer 220.

Display device 212 may be a cathode ray tube (CRT), or the like, for displaying information to a user. Keyboard 214 and cursor control 216 allow a user to interact with computer 220. Cursor control 216 may be, for example, a mouse. In an alternative configuration, keyboard 214 and cursor control 216 may be replaced with a microphone and voice recognition means to enable a user to interact with computer 220 in a hands free manner. For embodiments of computer 220 used in POP 110 and transmitter 108, display 212, keyboard 214 and cursor control 216 are normally omitted. Furthermore, for embodiments of computer 220 used in client 112, keyboard 214 and cursor control 216 may be replaced with a stylus (not shown) and a touch sensitive embodiment of display 139.

Communication interface 218 enables computer 220 to communicate with other devices or systems via any communications medium. For example, communication interface 218 may be a modem, an Ethernet interface to a LAN, an optical radiator, an RF transmitter, a printer interface, or the like.

Computer 220 may be adapted and modified to fulfill requirements associated with embodiments such as service provider 102, controller 106, transmitter 108, POP 110 and client 112. For example, computer 220 may be embodied as a network server at service provider 102 or controller 106 for facilitating communications over network 104. In transmitter 108 or POP 110, computer 220 may be embodied as an application specific processor for receiving data from controller 106 and formatting it into a wireless signal for transmission to client 112. In client 112, computer 220 may be embodied in a configuration minimizing size and power consumption at the expense of processor speed and system memory. As can be seen, computer 220 is adaptable using techniques known in the art for practicing embodiments of the invention.

Controller 106 serves as the interface between service provider 102, transmitter 108, and POP 110. The primary purpose of controller 106 is to receive data from service provider 102 and make it available to transmitter 108 in a format easily transmitted to client 112. In addition, data received at client 112 is formatted in such a way as to allow client 112 to extract relevant information without undue processing. Controller 106 performs its function by receiving service-provider-data at service controller 106a. Service controller 106a then passes the service-provider-data to broadcast information controller 106b. Broadcast information controller 106b is responsible for placing service-provider-data into a message format that is easily processed by client 112.

In most embodiments of the invention, transmitter 108 will operate essentially as a data repeater with respect to broadcast information received from controller 106. As a repeater, transmitter 108 may convert data present at network interface 120 into optical radiation using optical transmitter 128. When operating as a repeater, transmitter 108 may not perform any additional processing on broadcast information messages, other than performing routine error detection and correction. Transmitter 108 operating in this capacity is referred to as a dumb transmitter or emitter. Use of a dumb transmitter makes it possible to deploy less costly wireless networks for sending information to client 112.

When a dumb transmitter is used, data structures sent from controller 106 to transmitter 108 will appear at the output of optical transmitter 128. For example, broadcast information controller 106b may format data into a series of structured XML elements prior to making them available to transmitter 108 for forwarding to client 112. The use of XML elements for carrying data to client 112 facilitates efficient processing and extraction of information contained therein when received at client 112.

In a preferred embodiment of the invention, contextual information is efficiently provided to client 112 using XML elements and/or XML documents. An XML document is comprised of data and tags. Data refers to the actual content within a document and an example of data is character text. Tags are used to denote the structure, or format, of data within an XML document. XML elements serve as the fundamental components of an XML document and they may contain data or other elements, referred to as sub-elements. Since elements are often nested, the term root element is used to identify the element that is not contained within any other element in a given XML document.

In an XML document, tags are surrounded by markups which are open and closed brackets, "<" and ">", respectively. Tags serve as handles for identifying elements within an XML document. For example, a tag for identifying an airline may appear as "<airline>". As such, tags make XML documents easy to parse using readily available parsers. When elements are parsed, other software routines, modules, or applications may use the data contained in, or referenced by them.

Referring to the airline example, an airline acting as service provider 102 may employ tags within one or more XML documents associated with available services, namely particular flights. An exemplary, and non-limiting, hierarchy of tags for an XML document may appear as:

```
<airline name>
    <airport name>
        <airport wing>
            <gate number>
                <flight number>
                    <seat number>
```

From the example, it can be seen that the airline name is the root element and the sub-elements below it describe aspects about the service in greater and greater detail. If sending contextual information to a user located at a particular gate, e.g. gate 16 in the B-wing, the tags facilitate parsing by the infrastructure (controller 106 and transmitter 108) so a user of client 112 receives only relevant information.

If XML elements are employed to facilitate processing at client 112, it may be desirable to use a series of XML element types in conjunction with broadcast signals sent from controller 106 to transmitter 108. For example, it may be desirable to have broadcast information be comprised of three primary XML element types, hereinafter referred to as BI XML elements 300.

Figure 3:
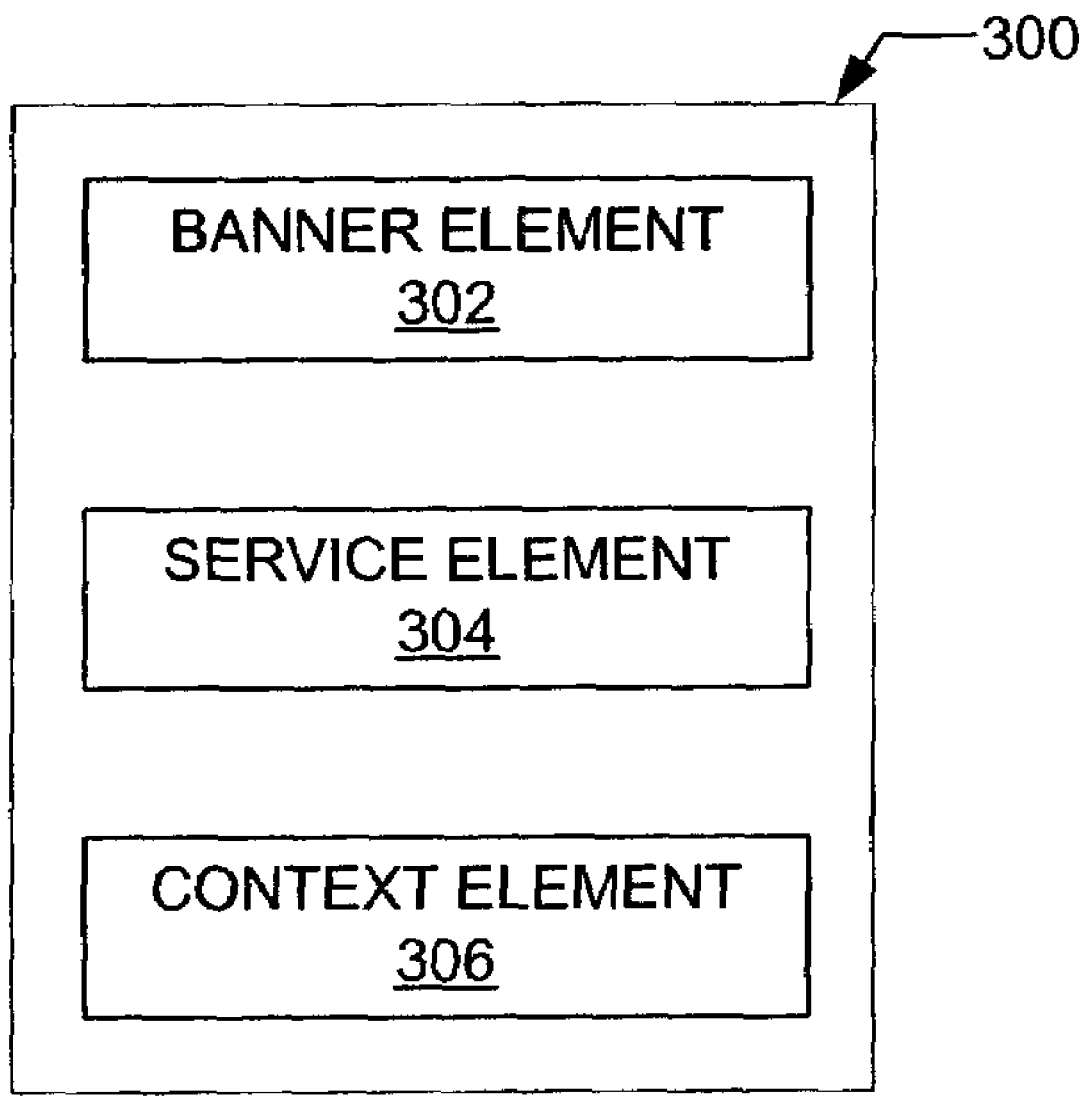
FIG. 3 is a block diagram showing examples of unidirectional communication signals that may be employed with embodiments of the invention.

FIG. 3 presents exemplary BI XML elements 300, which include a banner element 302, a service element 304, and a context element 306. BI XML elements 300 are unidirectional communication signals in that they travel in only one direction, namely from controller 106 to transmitter 108 and then to client 112. Banner element 302 may be used for making a ticker tape like display appear on display 139 of client 112. When client 112 receives banner element 302, any information contained therein may be displayed to a user of client 112. Since the location and coverage area associated with transmitter 108 are used to control distribution of information to only those areas where it is contextually relevant, client 112 does not have to perform any processing on banner element 302 to discern its contents. As such, any banner element 302 received at client 112 may be displayed to a user. Typically, banner element 302 is useful for making brief messages available to client 112.

Returning again to the airline example, banner element 302 may be used to display flight numbers and departure gates to a user located within the coverage area of the transmitter in B-wing of the airport.

Although banner element 302 may be primarily used for making brief messages available to client 112, it is not limited to those. For example, a number of banner elements 302 may be used to make substantially continuous messages available to client 112. Such a continuous banner message may occur, for example, if a speaker's presentation is converted to text for display to clients 112 located within the coverage area of one or more transmitters 108 associated with the presentation.

A service element 304 may be used to provide electronic services to client 112 located within a particular context. Service element 304 typically describes a service that is available to a user located within a particular context. More specifically, service element 304 dynamically describes a service to client 112. When received at client 112, service element 304 contains enough information to uniquely identify the offered service and to provide information needed for contacting the service.

Returning to the airline example, service element 304 may provide a client 112 within B-wing with electronic forms allowing them to change flights, obtain boarding passes, reserve concierge services, etc.

A context element 306 may be used as a wrapper around other BI XML elements 300 such as banner element 302. If used as a wrapper, the specific structure and content of context element 306 may depend on the particular environment that transmitter 108 is deployed in. When used to encapsulate another BI XML element such as banner element 302, context element 306 provides a mechanism for allowing client 112 to discern if it wants to make the information in the banner display available to a user.

Returning to the airline example, encapsulating a banner element 302 for indicating departure times and gates in a context element 306 directed to showing flights with available seats provides client 112 with a means for only displaying departures having available seats to a user wanting such information.

Employing unidirectional signals, such as BI XML elements 300, may pose problems; namely error detection and correction at a receiving device such as transmitter 108 or client 112. Embodiments of the invention may overcome this shortcoming by performing error detection for unidirectional signals using a special type of XML element called an integrity element. An integrity element may be used by the infrastructure, such as transmitter 108, or by client 112 to ensure proper reception of BI XML elements 300. In a preferred embodiment of the invention, each root XML element may be encapsulated in an integrity element when transmitted from controller 106 to transmitter 108 or client 112.

Figure 4A:
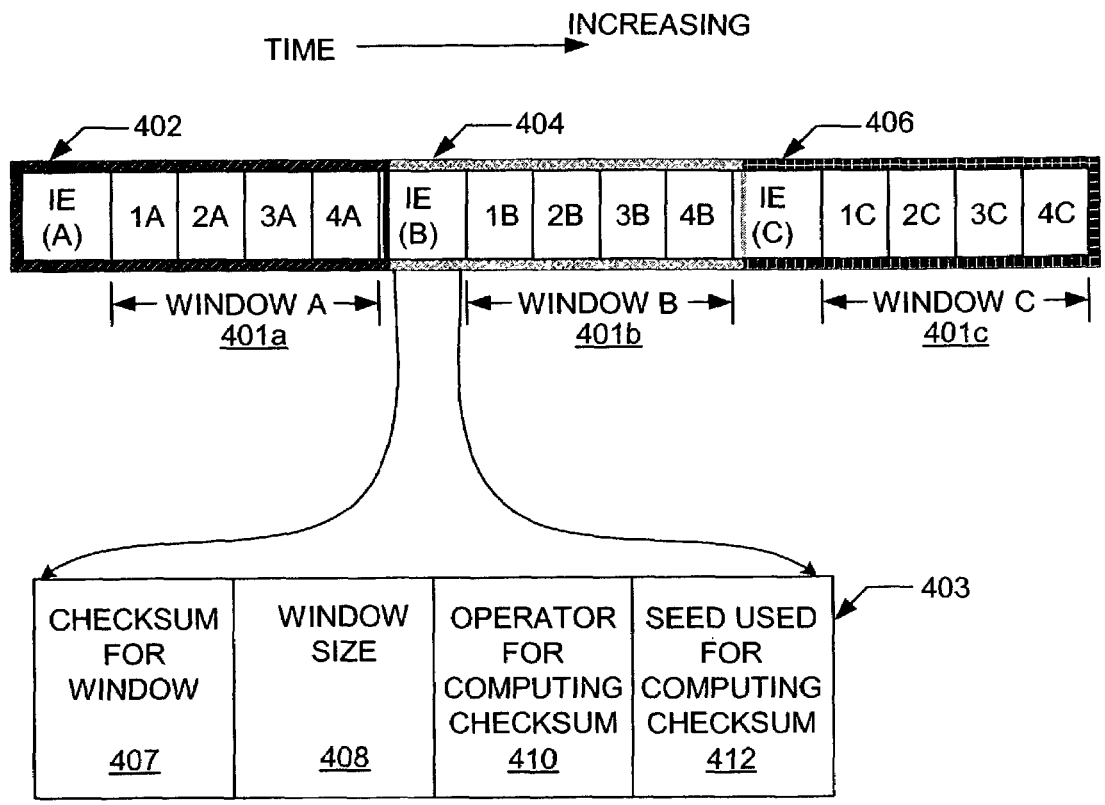
FIGS. 4A and B are schematic diagrams showing an exemplary data signal that may be received by a client.

FIG. 4A illustrates integrity elements 402, 404 and 406 which may be used to perform error detection for BI XML elements 300. Exemplary BI XML elements 300 are shown as bytes 1A-4A, 1B-4B and 1C-4C which are grouped into window A, 401a, window B, 401b, and window C, 401c, respectively. The bytes are comprised of bits of data containing information from service provider 102. Information may be comprised of an advertisement for a service provided by service provider 102, or alternatively, information may include the service itself as executable code or equivalent thereof. The grouping of BI XML bytes located within an integrity element is referred to as a window, or frame.

Broadcast information controller 106b may parse an exemplary broadcast message into bytes 1A-4A, 1B-4B, 1C-4C for transmission to transmitter 108. Then, broadcast information controller 106b may encapsulate the resulting windows 401a, 401b, 401c with integrity element 402, 404, 406, respectively. Integrity element 402, 404, 406 may contain a header 403 having a checksum value 407, a window size 408, an operator 410, and a seed 412. Checksum value 407 is normally computed over the bytes making up a respective window 401a, 401b, 401c using known techniques such as exclusive ORing (XORing) each byte with its neighbor. As such, checksum value 407 uniquely identifies the contents of the window 401a, 401b, 401c over which it was computed. Window size 408 identifies the number of bytes that checksum value 407 was computed over. Operator 410 identifies the mathematical operator used in computing checksum value 407. Seed 412 identifies the seed value used for computing the first value used when computing checksum value 407. Seed 412 may be set to zero if no seed value is used.

Here it is noted that a time element (not shown in FIG. 4), or timestamp, may also be included in window 401a, 401b, 401c. If used, a time element may contain data allowing transmitter 108, POP 110 or client 112 to determine a time relative to some reference. For example, a time element may provide time with respect to Greenwich Mean Time (GMT), a master clock within network 104, or a timer within transmitter 108. Use of a time element further enhances the context associated with client 112 because it allows client 112 to establish a temporal, or time, context in addition to the locational and personal context already described herein.

Figure 4B:
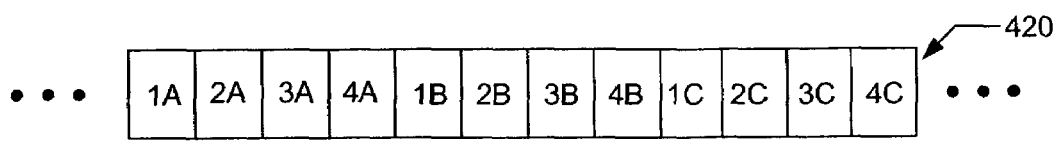

FIG. 4B illustrates a resulting broadcast information stream inside client 112 after integrity elements 402, 404 and 406 have been removed by parser 134. Parsers are well known and used in the art; therefore parsers will not be described in detail herein. When integrity elements 402, 404 and 406 are removed, the original data stream containing banner elements 302, service elements 304, context elements 306, or other data remain. The ellipses used in FIG. 4B indicate that the broadcast information stream may be substantially endless i.e. it may continue beyond that shown in FIG. 4B.

In other embodiments of the invention, transmitter 108 may be configured to accept messages in virtually any format. If configured as such, transmitter 108 may be equipped with processing hardware and software for converting incoming data into an XML based message for transmission to client 112.

As shown and discussed in conjunction with FIG. 1B, transmitter 108 contains the hardware and software necessary to convert electrical signals into optically radiated signals. When setting up an infrastructure for practicing the invention, placement of transmitters 108 and POPs 110 is very important because their respective coverage areas determine the locational context associated with clients 112 located therein. Since transmitter 108 may be configured as a dumb transmitter, having essentially no processing capability, or configured as a smart transmitter, having processing capability, they provide a network designer with great flexibility.

Dumb transmitters are small in size and inexpensive to build, therefore they may be deployed in larger numbers, thus allowing for smaller coverage areas within a given environment. Use of small coverage areas allows the infrastructure to better refine the locational context associated with a given transmitter 108. Refined locational context allows relevant information to be provided to a user in a more reliable manner.

Returning to the airline example, if low cost transmitters are deployed near each boarding gate in B-wing, then a user located within the coverage area of a gate transmitter may only receive information dealing with departures from the respective gate. Using transmitters with small coverage areas further reduces the processing demands on client 112 thus allowing less expensive and less capable PDAs to benefit from the invention.

Smart transmitters may be incorporated where it is desirable to move the processing out of the infrastructure portion that includes controller 106 and place it into transmitter 108. For example, it may be beneficial to employ smart transmitters when a general-purpose network, not employing special data structures such as BI XML elements 300, is providing raw data to particular locations. When smart transmitters are used they may employ virtually any communication protocol for receiving data from network 104 and controller 106. In such a configuration, transmitter 108 receives raw data and performs necessary filtering and processing to extract contextually relevant information using data formatter 124. Data formatter 124 then converts contextually relevant information into necessary BI XML elements 300. Next, information is passed to IR port driver 126 and then to optical transmitter 128 for transmission to client 112 as optical signal 142.

When transmitting optical signals to client 112, transmitter 108 may employ virtually any waveform generated using known modulation methods. Examples of modulation methods usable for transmitting optical signals compatible with embodiments of the invention are, but are not limited to, base band pulsing, frequency shift keying (FSK), amplitude shift keying (ASK), phase shift keying (PSK), pulse position modulation (PPM), or burst-PPM. In addition, transmitter 108 may transmit optical signals of virtually any wavelength.

Although transmitter 108 is very robust, it will normally be designed to leverage off of existing optical communication protocols and hardware used in client 112. Two of the most common optical communication protocols used in conjunction with inexpensive electronic devices, such as PDAs, laptop computers, cell phones, and the like, are those referred to as the diffuse optical communication protocol and the infrared-data-association (IrDA) communication protocol. Both protocols employ near infrared signals, where infrared denotes wavelengths of light that are too short for visual perception by humans.

The diffuse optical communication protocol is primarily used for setting up optical local area networks over small areas such as a classroom or auditorium. The primary distinction between diffuse optical communications and IrDA communications is that the former allows for many-to-many communication such as in a network and the later allows point-to-point, or one-to-one, communication. Advantages of diffuse optical signals are that they may offer either bidirectional or unidirectional communication capability. In addition, a diffuse optical signal can be used to accomplish communication when non-line-of-sight geometries are present. An example of a non-line-of-sight geometry is when a transmitter is located such that a straight line drawn from it to a receiver intersects a barrier before reaching the receiver. Such a geometry might exist if a cubicle wall was located between an optical transmitter attached to a ceiling and a laptop located on a desk within the cubicle.

Non line-of-sight communications is possible because a diffuse optical signal can bounce off obstructions and thus be reflected to a receiver. Using the cubicle wall example, a diffuse signal may bounce off the ceiling and room or cubicle walls and thus reach the laptop even though a line-of-sight path from the optical transmitter to the laptop is not present. Diffuse transmitters normally use arrays of photo emissive devices such as LEDs to transmit near-infrared signals having wavelengths in the range of 850 nanometers (nm) to 1250 nm. When used to accomplish one-way communications, a diffuse optical transmitter does not receive acknowledgements from a receiver, thus ensuring reliable one-way communications is difficult unless the receiver has a clear line-of-sight path to the transmitter that is not likely to encounter any inferences capable of distorting received data.

A non-profit trade association representing companies making computer and telecommunications hardware and software developed the IrDA protocol. The protocol is defined in an IrDA standard which is already employed in several million devices such as PDAs, laptops, and the like. As a result, leveraging off of IrDA capable devices is very desirable for implementing cost effective contextually relevant communication systems. As previously noted, IrDA protocol is for one-to-one optical communications that are directional in nature and occur over very short ranges. Specifically, IrDA transmitters have a beam extending roughly ±15° from the main transmission axis. As a result, two IrDA devices must have their respective infrared data ports pointed toward each other for communications to occur. In addition, IrDA devices should be within 1 meter of each other to ensure reliable communication. Reliable communication using IrDA devices also requires that the devices perform handshaking when communicating.

Handshaking is used to describe acknowledgements sent between communicating IrDA devices for ensuring reliable communication. The IrDA specification indicates proper handshaking requires that a device attempt to send data for at least 100 ms. If no acknowledgement is received after 100 ms, then a sending device may stop transmitting. Additionally, the IrDA standard also defines a media busy state. The media busy state requires that a device observe its IR port for 500 ms before transmitting if it has not already established a communication session with another device. If no signal is detected for 500 ms then the device waiting to transmit can begin sending infrared data. Like diffuse infrared signals, IrDA compliant signals typically have wavelengths between 850 and 1250 nm.

The IrDA standard also defines a protocol stack for facilitating communication by applications running on IrDA equipped devices. The protocol stack breaks the IrDA communication protocols into layers. Each layer deals with a manageable set of responsibilities and supplies needed capabilities to the layers above and below. The IrDA standard identifies both mandatory and optional protocol layers. Here the mandatory IrDA protocol layers will be discussed beginning with the bottom layer. The mandatory protocol layers are the physical layer, link access (LAP), link management (LMP), and information access service (IAS). Of the mandatory protocol layers, the physical layer and link layer are pertinent to an understanding of embodiments of the invention.

The physical layer specifies the optical characteristics, the encoding of data, and the framing of data for various speed communications. It includes the optical transceiver, deals with the shaping of the optical signals, handles the encoding of bits within a transmitted signal, and handles the beginning of frame (BOF), end of frame (EOF) flags, and cyclic redundancy checks (CRCs). Normally the physical layer is implemented in a combination of hardware and software; however it may be implemented solely in hardware if desired.

The LAP establishes the basic reliable connection; it receives data from and passes data to the physical layer. In order to isolate the LAP, and the layers above it from the hardware, a framer is employed between the physical layer and LAP. The framer is a software layer and it accepts incoming frames from the physical layer and makes them available to the LAP and does the reverse for transmitted data. The LAP corresponds to the open system interconnection (OSI) data link protocol and is responsible for retransmissions, low level flow control, and error detection. Making the LAP responsible for reliable data transfer frees the upper layers from the task and ensures that reliable data will be delivered to the layers above the LAP.

The invention takes advantage of the benefits provided by the diffuse infrared protocol and the benefits of IrDA protocol while avoiding many of their respective shortcomings. In particular, the invention transmits diffuse infrared signals to a client 112 having an IrDA compliant bi-directional communication interface. The invention accomplishes communication by replacing the diffuse link layer with an IrDA compliant link layer. Since the physical layers are essentially the same for diffuse infrared and IrDA compliant systems, compatible link layers make it possible for received data to be handled by client 112.

Conventional IrDA protocol layers operating above the link layer are designed to handle two-way communications. If left in place on a handheld device, these layers interfere with the reception and processing of unidirectional infrared signals at client 112. The invention solves this problem by replacing layers above the link layer with software modules designed to process unidirectional signals while still allowing the use of bi-directional IrDA communication signals when a diffuse infrared signal is not present at client 112.

The invention minimizes the chances of having a diffuse infrared signal interfere with an IrDA signal by gating diffuse infrared transmissions in such a way that the duration of a diffuse infrared pulse is less than the 500 ms IrDA retry interval. In a preferred embodiment of the invention, diffuse infrared transmissions from transmitter 108 are gated such that the signal has a 20 msec on-interval followed by a 980 msec off-interval. Use of 20 msec on intervals ensures that IrDA-to-IrDA communications can take place without violating the IrDA industry specification.

As previously discussed herein, the distinguishing feature between POP 110 and transmitter 108 is that POP 110 has a PDA interface 131 for allowing client 112 to communicate with POP 110 or service provider 102. Since POP 110 transmits locational context in addition to receiving client data, it will often be located in areas frequented by client 112. Therefore, the physical configuration of POP 110 can be such that it facilitates usage by client 112. In an embodiment of the invention, POP 110 can take the form of a kiosk. A kiosk is an unattended structure designed to facilitate user interaction therewith. As used herein, a kiosk provides client 112 with connectivity to network 104. When deployed as a kiosk, POP 110 may have a PDA interface 131 that is an electromechanical interface for exchanging data with client 112. An electromechanical interface allows client 112 to plug into an electrical connector over which data is exchanged. In an alternative embodiment the electromechanical interface may be replaced with a wireless interface. A wireless embodiment of PDA interface 131 allows client 112 to communicate with POP 110 using an RF or optical signal. POP 110 and client 112 may employ virtually any communication protocol for exchanging data using PDA interface 131; however, in a preferred embodiment client 112 uses XML based elements to accomplish bi-directional communication with POP 110.

As discussed herein, the invention employs both unidirectional and bi-directional communication signals for providing robust contextual communications between service provider 102 and client 112. Client 112 uses bi-directional communication signals to communicate information to, and to receive information from, service provider 102.

While not necessary to practice embodiments of the invention, it may be desirable to uses specific types of data structures, or signals, for facilitating efficient communications. For example, a set of bi-directional communication signals may be developed for practicing selected embodiments of the inventions. Examples of bi-directional communication signals incorporating XML elements that may be used with the invention are, but are not limited to, broadcast information update (BIU) data, client request data, service response data, client service proprietary communication data, and service-to-service communication data.

Broadcast Information Update (BIU) data may be used by controller 106 to track the status of transmitter 108. For BIU data to obtain information from transmitter 108, the transmitter should be configured to provide status information. Examples of useful status information that may be provided are error data, status of optical transmitter 128, internal temperature data, and power consumption data. Other parameters may be tracked depending on the specific configuration of a system. In addition to tracking transmitter status, BIU data may be used to update smart transmitters. For example, BIU data can include software updates for data formatter 124 or BIU data may include new encryption protocols for network interface 120. As can be seen, BIU data provides an efficient way to monitor and update transmitter 108.

Client request data is an XML element generated on client 112. In client 112 services may be represented as dynamically created software objects. Where a software object is a piece of software designed such that it accepts input data and makes output data available according to an agreed upon format. Software modules external to an object and wishing to communicate with it need only comply with the input data or output data format. External modules do not have to be concerned with the internal workings of the software object. Employing software objects enables software developers to re-use software objects in new environments without having to redevelop large amounts of software. Client request data is generated after a user has interacted with a service object on client 112. After client 112 connects to POP 110 using PDA interface 131, client request data is generated. An example of client request data is information that a user of client 112 has entered in response to a banner display or other message displayed on display 139.

Returning to the airline example, if a banner message appears on display 139 indicating that a user's flight is cancelled, the user may be able to activate a flight change form by touching the banner display, or an icon associated therewith, using a stylus. Upon activating the flight change form, the user is asked to enter information such as new flight number, seating preferences, and payment method. Upon entering the information, the user plugs client 112 into POP 110 and sends the information to the airline. The client request data is the XML element used to convey the entered information to the airline.

Service response data may be an XML element generated by a service provider in response to receipt of client request data. Depending on service provider 102, service response data may contain executable code for delivery to client 112, a reply to a question asked by client 112, an alert for display on display 139, an icon for display on client 112, or the like. Typically, service response data is only used during the initial contact between client 112 and service provider 102. For example, if an icon and executable code have previously been delivered to client 112, it may be desirable to have the icon and executable code associated with one another. If an icon and executable code are associated with one another, then a user may be able to activate a particular service by opening the associated icon for subsequent uses of the service.

Client Service Proprietary Communication (CSPC) data may be used by service provider 102 when communicating with client 112. For example, CSPC data may be used to deliver executable code from service provider 102 to client 112 after a user has interacted with an icon associated with service provider 102. Use of CSPC data allows service provider 102 and client 112 to interact in an efficient manner based on the type of service employed or task being accomplished. As such, CSPC data will not normally be comprised of XML elements. But rather, CSPC data will employ industry standard communication protocols such as TCP/IP or it may use special communication protocols such as encryption when carrying data over insecure networks.

Service-to-service communication (SSC) data may be an XML element used when one service provider must use another service provider to accomplish an interaction initiated by client 112. While the service-to-service exchange will be based on the needs of client 112, the exchange itself does not have to involve client 112. In alternative embodiments of the invention, service-to-service exchange may be accomplished without using XML based elements or documents.

Returning to the airline example, if client 112 requests a new ticket by sending client request data to the airline, the airline may need to charge a passenger's credit card. The credit card validation and charge would take place between the airline and the credit card company or a bank. As such, the airline and credit card company communication may be accomplished using SSC data.

As previously discussed, client 112 may be any type of portable computing device such as a PDA, handheld computer, or cell phone. Portable devices for use with the invention may take on many forms and have varying levels of sophistication. For example, portable devices may contain state of the art processors and large amounts of memory or, they may employ relatively slow processors and limited memory. In addition, portable devices may have other wireless communication capabilities, in addition to bi-directional infrared communication interfaces. Examples of other wireless communication capabilities are wireless Ethernet and cellular. Portable devices compatible with the embodiments will also have various means for allowing a user to interact with the device. For example, a portable device may have a touch sensitive display, a keyboard, a microphone for digitizing voice commands, a trackball, or the like. Although portable devices used with embodiments will vary to a large degree, all of them will operate in essentially the same manner when used to receive contextually relevant information consistent with the methods herein.

Figure 5:
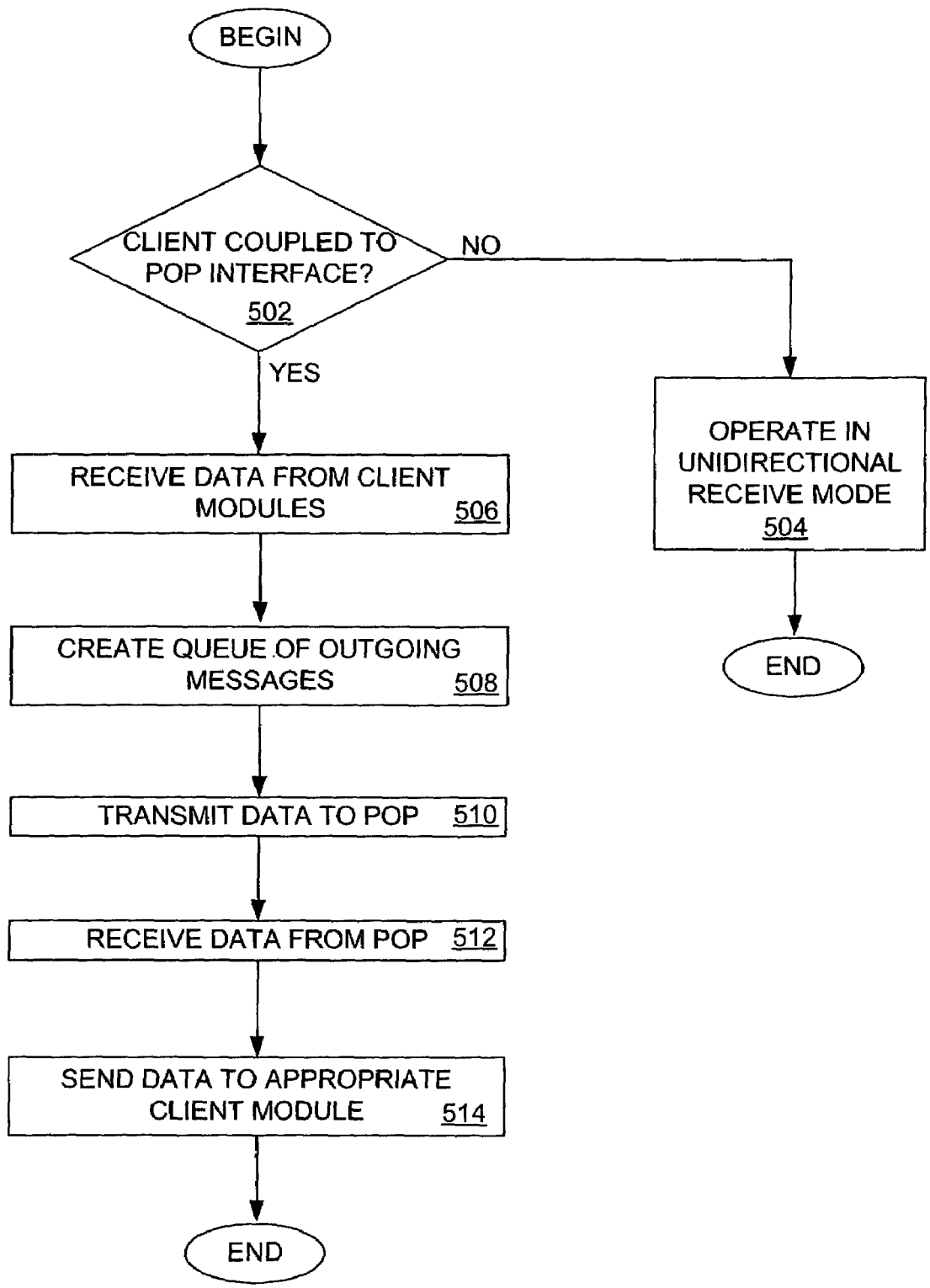
FIG. 5 is a flowchart showing an exemplary method of the invention for communicating with a handheld device.

FIG. 5 contains a flowchart illustrating an exemplary method for a data interchange between POP 110 and client 112. The method of FIG. 5 begins with client 112 determining if it is connected to PDA interface 131 at POP 110 (step 502). If client 112 determines that it is not connected to PDA interface 131, the method stops and client 112 may operate in a unidirectional mode (step 504). Upon sensing that client 112 is connected to a bi-directional communications interface, a communication module operating in software on client 112 may receive data from other software modules or applications operating within client 112 (step 506). Next, the communication module may create an outgoing message queue, or buffer, (step 508) before transmitting data to POP 110 (step 510). After transferring data to POP 110, the communication module may receive data from service provider 102 via PDA interface 131 on POP 110 (step 512). Received data may then be passed to destination software modules operating on client 112 (step 514).

Returning to the airline example, if a user completes a form for ordering a new ticket, a communication module may receive data from another module operating in client 112 such as a service display module responsible for controlling the display of information on client 112 (step 506). The communication module may then queue the order message (step 508) before sending it to POP 110 via PDA interface 131 (step 510). The airline may then process the order before sending a confirmation and receipt to client 112. The confirmation may be received at client 112 via PDA interface 131 (step 512) before being passed to a destination module such as display module (step 514) for presentation to a user of client 112.

Jini is a collection of Java Application Program Interfaces (APIs) and components developed by Sun Microsystems that are useful for building distributed systems. In particular, Jini employs Java's Remote Method Invocation (RMI) distributed communication infrastructure to provide an infrastructure for building distributed services that can dynamically register traits about themselves along with their availability. After the services have registered, Jini clients connected to the network are able to dynamically discover and make use of those services. The Jini infrastructure makes it possible for services and clients to enter and leave the network in as essentially seamless manner.

The primary entities in a Jini network are lookup services, Jini services, and Jini clients. The lookup service acts as a registry for Jini clients and Jini services entering and leaving the network. Jini services and Jini clients are the typically the entities wishing to communicate with one another. Jini services and clients may be devices such as disk drives or computers or they can be more sophisticated entities such as corporations or Internet Service Providers (ISPs). The primary distinction between services and clients is that a Jini service provides information or resources to another entity on the network while a Jini client is an end user of the information or resources provided by other entities coupled to the network. In a Jini network an entity can operate as a client or a service depending on the operations being performed, thus employing a Jini network provides great flexibility along with an ability to dynamically adapt the overall network for handling varying demands.

As previously noted, a key feature of a Jini network is the ability to handle the dynamic entry and departure of Jini clients and services to and from the network. When a device enters or connects to the Jini network, it broadcasts a presence announcement indicating where the device may be found. The broadcasting of the presence announcement is called discovery and it normally contains a discovery request comprising an IP address and a port number for the device. The discovery request is received by the lookup service, which in turn sends an object called a service registrar back to the device requesting discovery. Upon receiving the service registrar object, the device may join the Jini network.

After the join operation is complete, the device sends a service item to the lookup service. The service item is a container for objects that other entities on the network use to communicate with the device. For example, an object within the service item may be a service object which is used by a client to implement interfaces necessary for the client to interact with a service. Furthermore, a service object may include attributes (e.g. an icon) or objects that give more information or details about information needed to facilitate communication between the client and service.

When a client enters the Jini network it performs discovery by issuing a query. The client inserts a service template into the query before sending it to the lookup service. The service template identifies what the client wants. The lookup service responds by sending the client a service ID uniquely identifying a service or group of services meeting the client's requirements.

Figure 6:
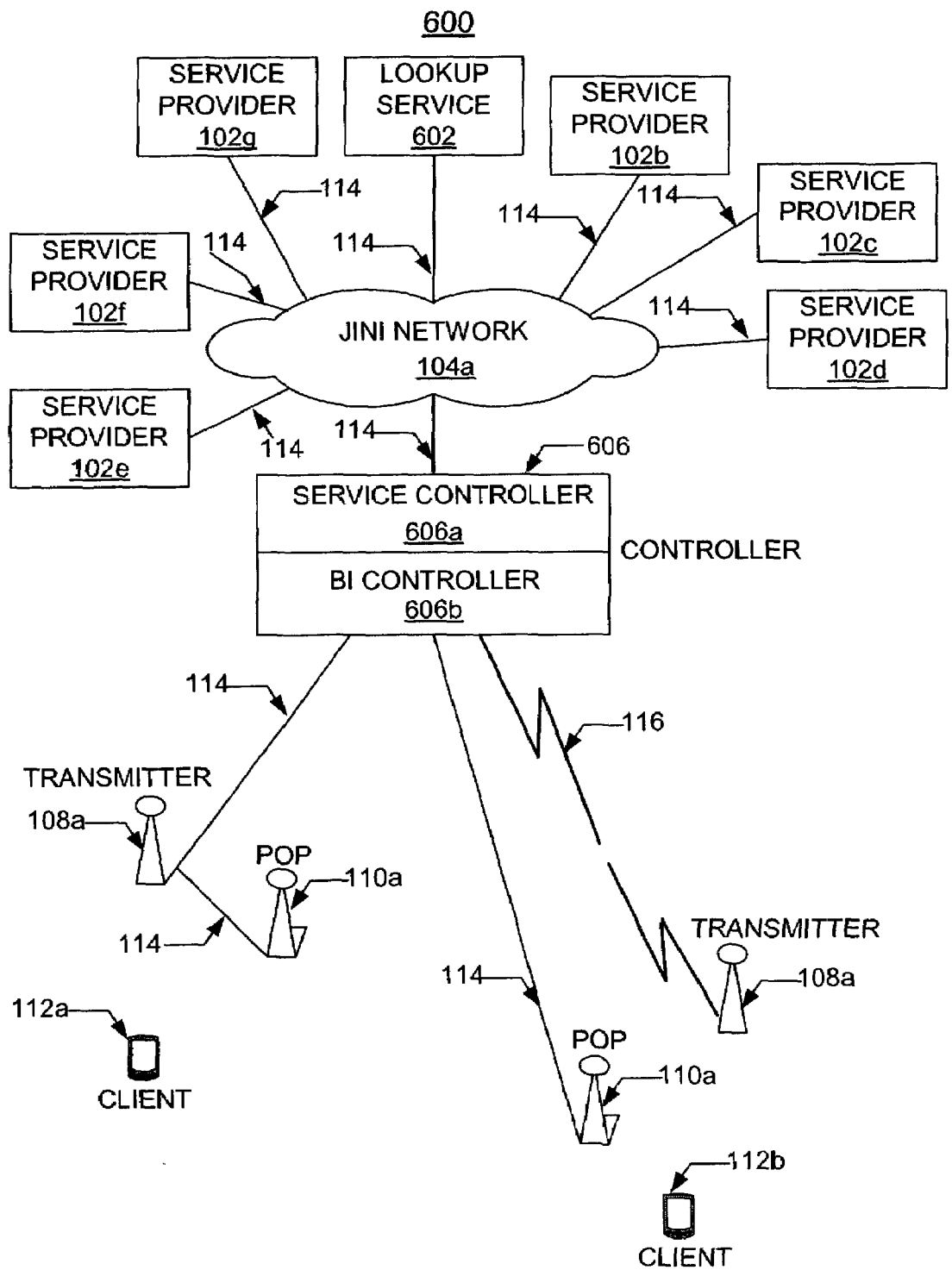
FIG. 6 is a schematic diagram showing an exemplary system of the invention for communicating with a handheld device.

FIG. 6 illustrates an embodiment of the invention employing a Jini compliant network for making contextually relevant information available to a compatible client 112*a*. System 600 comprises a Jini network 104*a* communicatively coupling a Jini lookup service 602, a plurality of Jini service providers 102*b*-102*g*, a Jini controller 606, a Jini transmitter 108*a*, a Jini POP 110*a*, and Jini compatible clients 112*a* and 112*b* using links 114. Methods for registering Jini service providers 102*b*-102*g* and Jini compatible clients 112*a*, 112*b* will discussed hereinbelow in conjunction with FIG. 7 and FIG. 8.

Figure 7:
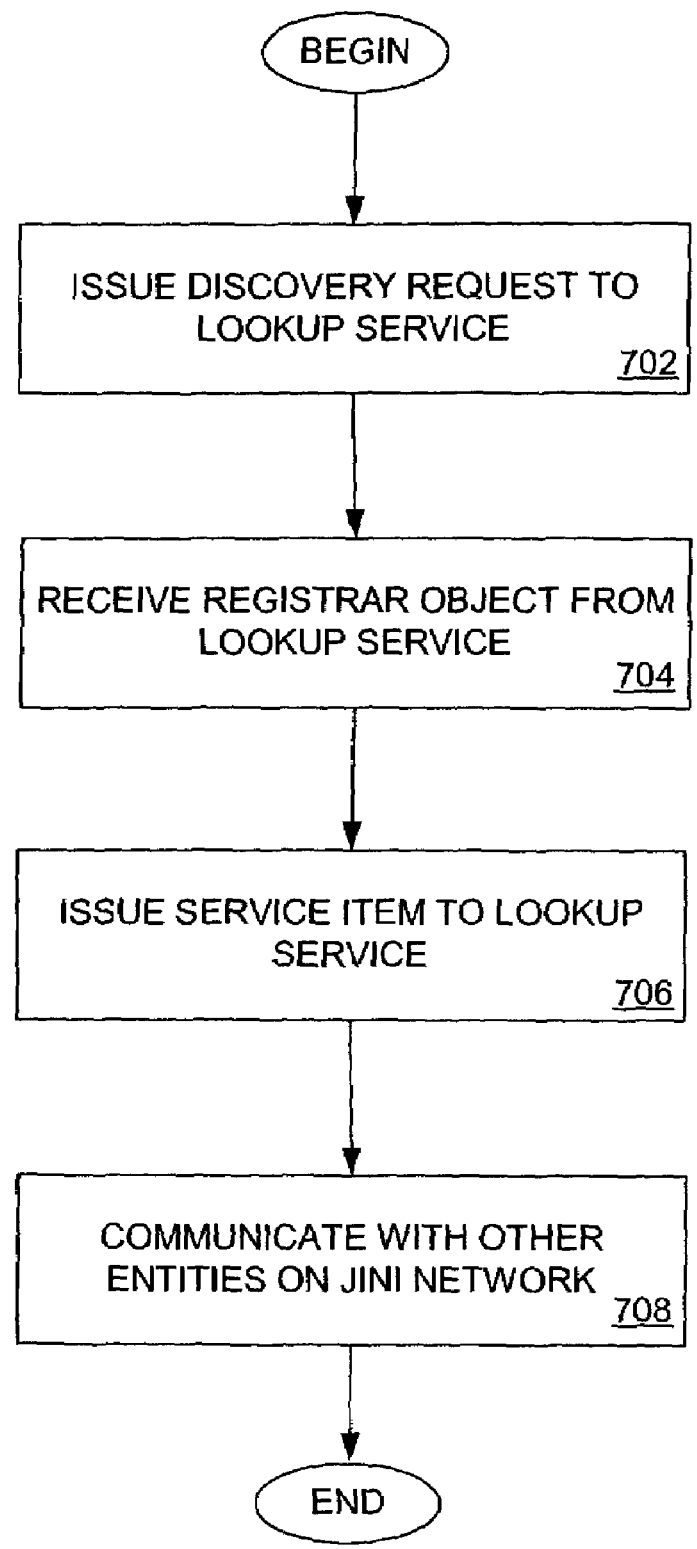
FIG. 7 is a flowchart showing an exemplary method of the invention for joining a wireless network.

FIG. 7 is a flowchart depicting an exemplary method for enabling Jini service providers 102*b*-102*g* to register with lookup service 602. Jini service providers 102*b*-102*g* may be service providers such as those discussed previously herein such as airlines, credit card validation services and the like. Alternatively, Jini service providers 102*b*-102*g* may be devices such as network attached storage (NAS) devices, communication portals to other networks, or the like, that are useful to Jini compatible clients 112*a*, 112*b*. When a Jini service provider, e.g. 102*b*, wishes to use Jini network 104*a*, it sends a discovery request to lookup service 602 (step 702). Lookup service 602 returns a service registrar object to Jini service provider 102*b* (step 704). After receiving the service registrar object, Jini service provider 102*b* sends a service item to lookup service 602 so that other entities on Jini network 104*a*, such as client 112*a*, may communicate with it (step 706). For example, if Jini compatible client 112*a* is looking for network-attached storage to store data files for access by another entity on Jini network 104*a*, it would contact lookup service 602 to find a service provider able to provide the desired storage service. After sending the service lookup item to lookup service 602, Jini service provider 102*b* may communicate with other registered entities on Jini network 104*a* (step 708).

Figure 8:
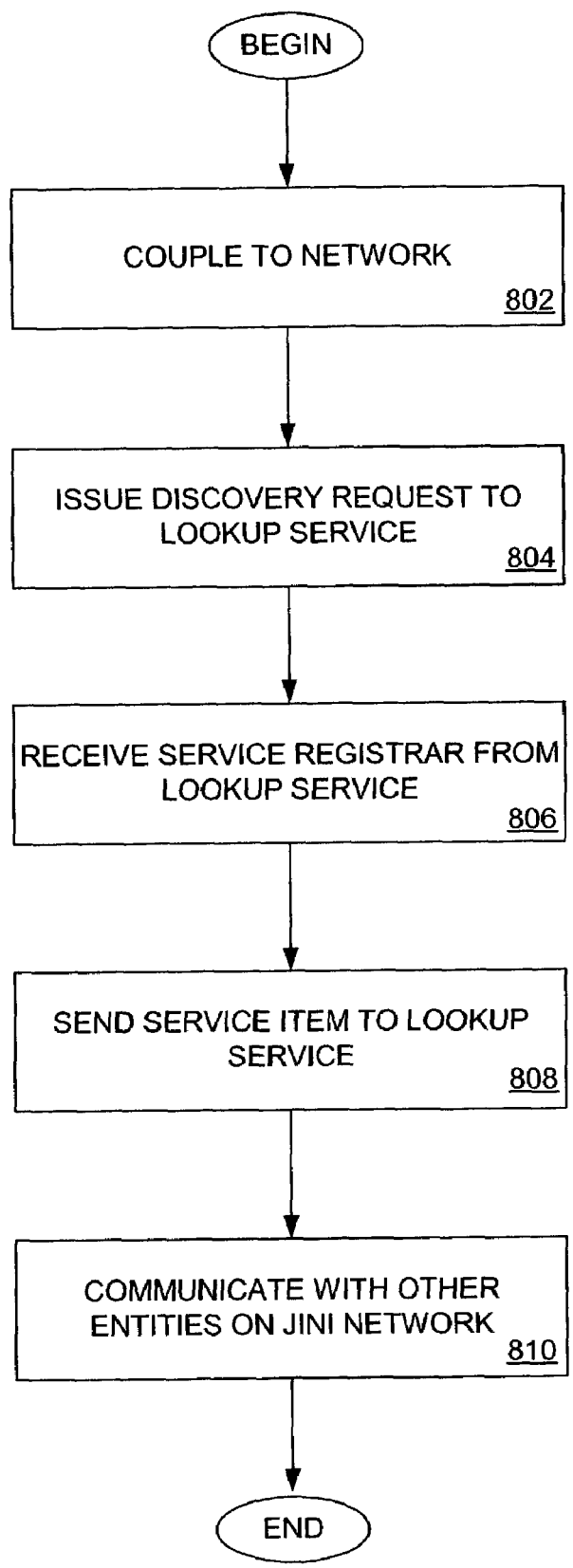
FIG. 8 is a flowchart showing an exemplary method of the invention for communicating over a wireless network.

FIG. 8 is a flowchart depicting an exemplary method for enabling a Jini compatible client such as 112*a* to enter Jini network 104*a* so that it may take advantage of services offered by other entities coupled to the network. Jini client 112*a* announces its presence to lookup service 602 using PDA interface 131, POP 110*a* and controller 606 (step 802). Jini client 112*a* may communicate with PDA interface using an electromechanical connecting means such as a connector or it may communicate via a wireless communication means such as RF or optical. Jini client 112*a* performs discovery by sending a message to lookup service 602 over Jini network 104*a* (step 804). Lookup service 602 returns a service registrar object to Jini client 112*a* using Jini network 104*a*, and Jini transmitter 108*a* or POP 110*a* (step 806). After receiving the service registrar object, Jini client 112*a* sends a service item to lookup service 602 (step 808). After the service item is received at lookup service 602, Jini client 112*a* may communicate using Jini network 104*a* (step 810).

In another embodiment, Jini client 112*a* may register with Jini network 104*a* without having to transmit data essentially simultaneously with its entry into the network. For example, Jini client 112*a* can pre-register with lookup service 602 if it knows that it will be operating within a particular coverage area associated with transmitter 108*a* or POP 110*a* during a given time interval. When Jini client 112*a* pre-registers, it may receive a lifetime voucher allowing it to utilize Jini network 104*a* only during the specified time interval. Upon expiration of the specified time interval, the lifetime voucher expires and Jini client 112*a* can no longer utilize Jini network 104*a*. Pre-registration may be useful for events such as conventions or seminars when a user of Jini client 112*a* knows that they will be operating in a particular area during a certain time interval. Pre-registration has the advantage that it allows less capable clients to take advantage of Jini's features without having to perform all of the two-way communications necessary to establish a presence in Jini network 104*a* using conventional discovery and join procedures.

The invention provides versatile solutions to problems associated with providing contextually relevant information to handheld devices. While preferred embodiments have been presented and discussed in the foregoing detailed description of preferred embodiments, alternative embodiments are possible in view of the teachings contained therein. Alternative embodiments are possible for service provider 102 and 102*b-g*, network 104 and 104*a*, controller 106 and 606, transmitter 108 and 108*a*, POP 110 and 110*a* and client 112 and 112*a-b*. Non-limiting examples of selected alternative embodiments will be provided hereinbelow.

In a first alternative embodiment, service providers 102-102*a* and/or 102*b-g* may bid against each other when attempting to provide services to client 112, 112*a-b*. The bidding process functions essentially like an auction where client 112, 112*a-b* attempts to obtain a service at the lowest cost. Here it is noted that cost can be any metric useful for assessing the merits of a service. For example, cost may be a monetary unit, a bandwidth unit, a measure of functionality, or the like. Controller 106, 606 may serve as the clearinghouse for managing the auction and for accepting the winning bid. Controller 106, 606 may then couple the successful service provider to client 112, 112*a-b*. In the bidding process, service providers 102, 102*a*, 102*b-g* may act alone or in concert with one or more other service providers 102, 102*a*, 102*b-g* in order to provide client 112, 112*a-b* with the desired service at an acceptable cost.

In a second alternative embodiment, client 112 may use specialized electronic circuitry to further minimize size and power consumption of service provider 102, controller 106, transmitter 108, POP 110, client 112 or network components. For example, functionality of the respective components may be incorporated into a field programmable gate array (FPGA), application specific integrated circuit (ASIC), or the like thus reducing size and power consumption. For example, FPGAs and ASICs may be used when fabricating a wearable client 112 or when design constraints dictate that transmitter 108 or POP 110 be very small.

A third alternative embodiment of the invention may pool service providers 102, 102*a*, 102*b-g* rather than have them operate separately or in small federations. Pooling service providers 102, 102*a*, 102*b-g* has the benefit of simplifying bi-directional communications from POP 110 or client 112. Communications are simplified because only one type of message protocol may be required when service providers 102, 102*a*, 102*b-g* communicate among themselves for with controller 106. Software coupling the pool of service providers to controller 106 may be used to efficiently decode information received from client 112 via transmitter 108 before passing the information on to one or more relevant service provider 102, 102*a*, 102*b-g* within the pool.

In a fourth alternative embodiment, controller 106 may be incorporated into one or more service providers 102, 102*a*, 102*b-g* rather than being employed as a standalone device as depicted in FIG. 1A. Incorporating controller 106 service provider 102 may be desirable when service provider 102, 102*a*, 102*b-g* is communicating with a small number of transmitters 108 and POPs 110 having finite coverage areas. An example of this configuration would be if an airport acted as service provider 102, 102*a*, 102*b-g* and provided information to clients 112 operating only within the airport itself.

A fifth alternative embodiment may be practiced by incorporating transmitter 108 or POP 110 into other structures utilizing communication means other than optical. For example it may be desirable to incorporate transmitter 108 in to a cellular transceiver servicing a microcell such as a sporting complex. Here integrating transmitter 108 with a cellular transceiver allows client 112 to receive information via optical signal 142 and reply using either optical radiation or RF radiation. For example if a sporting complex ran a contest where the first person calling in with a correct answer to a sports trivia question won a prize, a user could receive contextually relevant information about the contest via optical signal 142, provide user input 140 using a stylus, and send a reply directly to the appropriate phone number using an RF signal 143 such as a cellular signal.

In a sixth alternative embodiment, transmitter 108 and POP 110 may generate optical signal 142 by modulating an electric light using techniques known in the art. Several techniques are known in the art for modulating the drive signal to incandescent or fluorescent lights in a manner causing the lights to emit infrared signals while still performing their normal lighting functions. Using existing lighting fixtures as transmitters may help produce cost effective infrastructures for delivering contextually relevant information to a user of client 112.

In a seventh alternative embodiment, broadcast signals may not employ XML elements. In a preferred embodiment, broadcast signals comprised XML elements to facilitate context sensitive computing without requiring excessive processing in client 112. In embodiments where client 112 has sufficient processing power, broadcast signals may take on essentially any form and may employ essentially any network protocol. For example, if client 112 is installed in a vehicle, minimizing power consumption may not be an issue. Therefore, the infrastructure may employ protocols and data types that require more processing at client 112 without placing undue strain on it.

In an eighth alternative embodiment service provider 102, 102*a*, 102*b-g*, controller 106, 606, transmitter 108, 108*a*, POP 110, 110*a* or client 112, 112*a-b* may be designed using object oriented programming techniques. Object oriented programming utilizes software modules, or objects, as the primary building blocks for software on a respective platform. Modules are designed so that they accept inputs from and provide outputs to other software modules according to a defined format. Modules wishing to communicate with each need only know the input or output format of the module they wish to communicate with. Using object oriented programming techniques makes it possible for controller 106, 606, transmitter 108, 108*a* or client 112, 112*a-b* to take on differing levels of functionality based on their respective environments. For example, controller 106, 606 may be implemented with a software module that sends data in XML format and another module that sends data in an encrypted format. A controller 106, 606 so equipped can switch from communicating XML elements to encrypted traffic by interfacing the appropriate module to link 116. An important benefit of using object oriented programming techniques is that components can modify their operation without requiring hardware changes which tend to be expensive and time consuming to implement. As can be seen, using object oriented programming techniques allows the invention to be easily adapted for addressing a wide range of wireless communication problems.

As-can be seen from the alternative embodiments and preferred embodiments discussed herein, it will be obvious to those skilled in the relevant arts that many additional embodiments and modifications are possible without departing from the spirit of the invention. Therefore, the present embodiments are to be considered in all respects as illustrative and not restrictive, the scope of the invention being indicated by the appended claims rather than by the foregoing description, and all changes within the meaning and range of equivalency of the claims are therefore intended to be embraced therein.

What is claimed is:

1. A system for making a service available over a network in response to an advertisement conveyed to users operating handheld devices, said system comprising:
   means for advertising said service over said network by conveying said advertisement to a transmitter having a photo emissive device associated therewith, said photo emissive device for conveying said advertisement as a transmitted signal to said handheld devices located within a coverage area associated with said transmitter;
   means for providing said service over said network; and
   a diffuse infrared protocol capable of providing communications between said transmitter and said handheld devices, said protocol defining a first link layer in said transmitter that matches a second link layer in said handheld devices;
   wherein said second link layer is an infrared-data-association (IrDA) compliant link layer;
   wherein said handheld devices generate replies in response to said advertisement; and
   wherein said replies are conveyed to said system using a point-of presence (POP) associatively coupled to said network and said system.

2. The system of claim 1 wherein said photo emissive device is an infrared emitter.

3. The system of claim 2 wherein said transmitted signal is a diffuse infrared signal.

4. The system of claim 3 wherein said transmitted signal has a wavelength in the range of substantially 850 nanometers to 1250 nanometers.

5. The system of claim 1 wherein said advertisement is comprised of an XML element.

6. The system of claim 5 wherein said advertisement is encapsulated in an integrity element.

7. The system of claim 6 wherein said integrity element is an XML element.

8. The system of claim 1 wherein said service is provided to said handheld devices in response to preferences expressed by users of said handheld devices.

9. The system of claim 8 wherein said preferences are expressed using plug-ins running on said handheld devices.

10. The system of claim 8 wherein said preferences are stored in a service controller associated with said network, said service controller communicatively coupled to said system and said handheld devices.

11. The system of claim 1 wherein said system generates responses after receiving said replies, said responses comprising at least a portion of said service associated with said advertisement.

12. A method for providing a service over a network in response to an advertisement, said method comprising:
   generating said advertisement about said service at a service provider; and
   conveying said advertisement to a transmitter having a photo emissive device associated therewith and operatively coupled to said network, said transmitter further conveying said advertisement to handheld devices having users associated therewith;
   providing communications between said transmitter and said handheld devices through a diffuse infrared protocol; and defining, through the diffuse infrared protocol, a first link layer in said transmitter that matches a second link layer in said handheld devices;
wherein said second link layer is an infrared-data-association (IrDA) compliant link layer;
wherein said handheld devices generate replies in response to said advertisement; and
wherein said replies are conveyed to said service provider using a point-of-presence (POP) associatively coupled to said network.

13. The method of claim 12 further comprising:
associating a first XML element with said advertisement.

14. The method of claim 13 wherein said conveying further comprises:
at said transmitter, generating a diffuse infrared signal having a wavelength in the range of substantially 850 nanometers to 1250 nanometers.

15. The method of claim 14 further comprising:
encapsulating said advertisement in an integrity element.

16. The method of claim 15 further comprising:
associating a second XML element with said integrity element.

17. The method of claim 16 further comprising:
receiving, at the service provider, said point-of-presence (POP), said replies having originated at said handheld devices in response to said users having expressed an interest in said advertisement.

18. The method of claim 17 further comprising:
generating, at the service provider, responses to said replies, said responses comprising at least a portion of said service.

19. The method of claim 18 further comprising:
communicating with a financial vendor over said network to obtain a payment for said at least a portion of said service.

20. A method for providing a service over a network in response to advertisement conveyed to users operating handheld services, said method comprising the steps of:
generating an advertisement associated with said service at a service provider;
making said advertisement available to said network, said network for conveying said advertisement to a transmitter having a photo emissive device associated therewith, said transmitter further conveying said advertisement to handheld devices having users associated therewith; and
receiving a replies over said network, said replies having been placed on said network by a point-of presence (POP) associatively coupled to said network after receiving said replies from said handheld devices, said handheld devices having generated said replies after displaying said advertisement to users associated therewith,
providing communications between said transmitter and said handheld device through a diffuse infrared protocol; and
defining, through the diffuse infrared protocol, a first link layer in said transmitter that matches a second link layer in said handheld devices;
wherein said second link layer is an infrared-data-association (IrDA) compliant link layer.

21. The method of claim 20 further comprising:
interacting with said advertisement using a plug-in.

22. The method of claim 21 further comprising:
interacting with said advertisement if users of said handheld devices have expressed an interest in said advertisement prior to receiving it.

23. A network for conveying an advertisement associated with a service offered by a service provider to users operating handheld devices, said network comprising:
means for determining a destination for said advertisement, said destination having a photo emissive device capable of generating an infrared-data-association (IRDA) compliant diffuse infrared signal having a coverage area associated therewith and said photo emissive device for conveying said advertisement to said handheld devices;
means for conveying said advertisement to said destination over said network;
means for providing said IrDA compliant diffuse infrared signal though a diffuse infrared protocol; and
means for defining, though said diffuse infrared protocol, IrDA compliant link layers in said handheld devices;
wherein said handheld devices generate replies in response to said advertisement; and
wherein said replies are conveyed to said service provider using a point-of-presence (POP) associatively coupled to said network.

24. The network of claim 23 further comprising:
means for receiving replies generated in response to said users having expressed an interest in said services.

25. The network of claim 24 further comprising:
means for delivering said replies to said service provider.

26. The network of claim 25 further comprising:
means for receiving a response from said service provider, said response comprising at least a portion of said service.

27. The network of claim 24 wherein said replies are received from said point-of-presence (POP).

28. The network of claim 27 wherein said destination is a point-of-presence (POP) capable of receiving a reply from said handheld devices operating within said coverage area and having infrared-data-association (IrDA) compliant bi-directional communication interfaces associated with said link layers.

29. The network of claim 28 wherein said network executes a protocol selected from the group of protocols consisting of Jini and Corba.

30. The network of claim 28 further comprising:
means for passing financial information to a payment vendor, said payment vendor for debiting client device accounts associated with said handheld devices and for crediting a service provider account associated with said service provider.

31. The network of claim 24 wherein said replies are received from a point-of-presence (POP) communicatively associated with said handheld devices operating within said coverage area.

32. A method for conveying an advertisement over a network from a service provider to handheld devices having diffuse infrared signals operating within a coverage area associated with a transmitter conveying an infrared-data-association (IrDA) compatible diffuse infrared transmitter signal having a diffuse infrared protocol link layer, said method comprising:
receiving said advertisement from said service provider over said network;
routing said advertisement to said transmitter over said network;
receiving replies from a point-of-presence (POP) associatively coupled to said network, said replies having been generated at said handheld devices;
conveying said replies using said point-of-presence (POP) to said service provider over said network;

providing communications between said transmitter and said handheld devices through a diffuse infrared protocol; and defining, through the diffuse infrared protocol, IrDA compliant link layers in said handheld devices that match the diffuse infrared protocol link layer in said transmitter.

33. The method of claim 32 further comprising:
generating said replies in response to of said handheld devices having expressed an interest in said advertisement.

34. The method of claim 32 further comprising:
replacing the diffuse infrared protocol link layer with an infrared-data-association (IrDA) compliant link layer compatible with said diffuse infrared signals on said handheld devices.

35. The method of claim 34 wherein said diffuse infrared signals have a wavelength in the range of substantially 850 nanometers to 1250 nanometers.

36. The method of claim 35 further comprising:
associating an XML element with said advertisement.

37. The method of claim 36 further comprising:
encapsulating said advertisement in an integrity element prior to conveying it to said handheld devices.

38. The method of claim 37 further comprising:
using a Jini network protocol for conveying said advertisement to said transmitter and said replies to said service provider.

39. The method of claim 37 further comprising the steps of:
conveying debit requests associated with said handheld devices to a financial vendor over said network; and
conveying a payment from said financial vendor to said service provider over said network.

40. A system for performing infrared data communication with handheld devices using an infrared-data-association (IrDA) compatible diffuse infrared signal, said system comprising:
means for generating an advertisement associated with a service, said service further being associated with a service provider;
means for converting said advertisement into an advertising signal;
means for making said advertising signal available to a network;
means for receiving said advertising signal at a transmitter over said network, said transmitter further having a photo emissive device associated therewith for producing a transmitted signal containing at least a portion of said advertising signal;
means for transmitting said transmitted signal to the handheld devices;
means for receiving replies at a point-of-presence (POP) associatively coupled to said network and said system from the handheld devices;
means for conveying said replies using said point-of-presence (POP) to said service provider over said network;
providing communications between said transmitter and said handheld devices through a diffuse infrared protocol; and
defining, through said diffuse infrared protocol, a first link layer in said transmitter that matches IrDA compliant link layers in said handheld devices.

41. The system of claim 40 wherein said network is an Internet protocol network.

42. The system of claim 40 wherein said transmitted signal has wavelength in the range of substantially 850 nanometers to 1250 nanometers.

43. The system of claim 42 wherein said handheld devices have bi-directional infrared-data-association (IrDA) compliant communication interfaces.

44. The system of claim 43 further comprising software plug-ins for facilitating generation of said replies at said handheld devices.

* * * * *

UNITED STATES PATENT AND TRADEMARK OFFICE
CERTIFICATE OF CORRECTION

| | |
|---|---|
| PATENT NO. | : 7,386,238 B2 |
| APPLICATION NO. | : 10/230564 |
| DATED | : June 10, 2008 |
| INVENTOR(S) | : Noah J. Ternullo et al. |

It is certified that error appears in the above-identified patent and that said Letters Patent is hereby corrected as shown below:

Title Page, on page 2, in the References Cited, U.S. Patent Documents, the following reference is missing from the list:

6,553,412 B1   4/2003        Kloba ..................................... 709/219

Signed and Sealed this

Sixteenth Day of December, 2008

JON W. DUDAS
*Director of the United States Patent and Trademark Office*